(12) United States Patent
Sumio et al.

(10) Patent No.: US 6,336,011 B1
(45) Date of Patent: Jan. 1, 2002

(54) SHEET BINDING SYSTEM FOR AN IMAGE FORMING APPARATUS

(75) Inventors: Hiroshi Sumio, Tokyo; Hirohiko Ito, Yokohama; Nobuaki Miyahara; Bungo Shimada, both of Tokyo, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/282,461

(22) Filed: Mar. 31, 1999

(30) Foreign Application Priority Data

Apr. 6, 1998 (JP) .......................................... 10-092875

(51) Int. Cl.⁷ .............................................. G03G 15/00
(52) U.S. Cl. ......................................... 399/82; 399/364
(58) Field of Search ........................... 399/83, 82, 309, 399/364, 401; 430/142; 358/448

(56) References Cited

U.S. PATENT DOCUMENTS 5,105,230 A * 4/1992 Emori .......................... 399/14
5,301,036 A * 4/1994 Barrett et al. ................ 358/448
5,461,459 A * 10/1995 Muramatsu et al. ..... 359/448 X
5,508,810 A * 4/1996 Sato ........................ 358/448 X \* cited by examiner

*Primary Examiner*—Quana M. Grainger
(74) *Attorney, Agent, or Firm*—Fitzpatrick, Cella, Harper & Scinto

(57) ABSTRACT

An image formation apparatus obtains optimum double-face print output results aligned in a binding direction even if plural recording sheet sizes mixedly exist in one document. To do so, a CPU of a formatter unit judges consistency between image formation directions on different-size recording sheets on the basis of a designation state of a short edge binding double-face mode or a long edge binding double-face mode designated to a print job by a PC/WS and a designation state of the recording sheet size independently designated to each page of the print job, and it is then controlled based on the judged result that double-face image formation to the recording sheet of either of the designated sizes is performed based on the other double-face mode than the double-face mode actually designated to the print job.

36 Claims, 16 Drawing Sheets

LONG EDGE BINDING
DOUBLE-FACE MODE

SHORT EDGE BINDING
DOUBLE-FACE MODE

PORTRAIT DRAWING

LANDSCAPE DRAWING

LONG EDGE FEED

SHEET FEED DIRECTION

SHORT EDGE FEED

SHEET FEED DIRECTION

FIG. 16A
FORMED DOCUMENTS

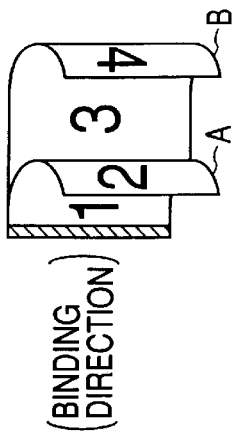
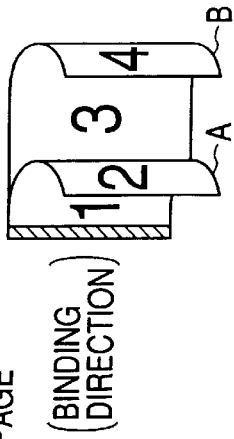

A4 PORTRAIT
A4 PORTRAIT
A3 LANDSCAPE
A3 LANDSCAPE

FIG. 16B
DRIVER SETTING
[DOUBLE-FACE LONG EDGE BINDING (LONG EDGE BINDING DOUBLE-FACE MODE)]

DRIVER INSTRUCTION

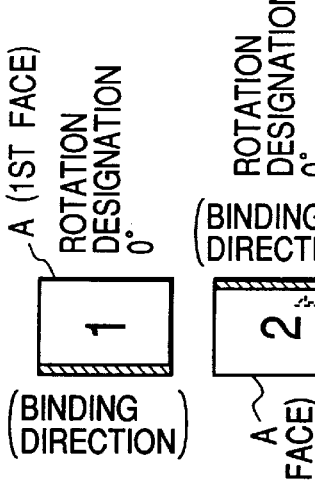

A (1ST FACE) ROTATION DESIGNATION 0°
(BINDING DIRECTION)

ROTATION DESIGNATION 0°
(BINDING DIRECTION)
A (2ND FACE)

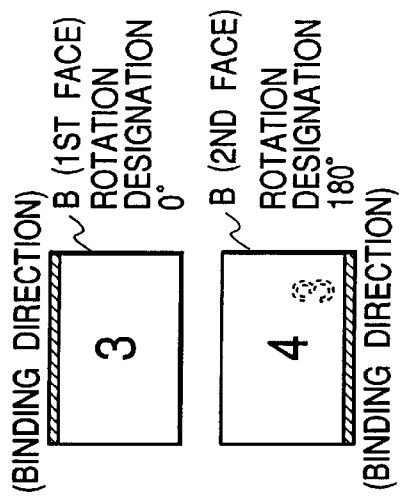

B (1ST FACE) ROTATION DESIGNATION 0°
(BINDING DIRECTION)

B (2ND FACE) ROTATION DESIGNATION 180°
(BINDING DIRECTION)

(RECORDING SHEET A: LONG EDGE FEED
RECORDING SHEET B: SHORT EDGE FEED)

FIG. 16C
IN CASE WHERE OUTPUT IS PERFORMED ACCORDING TO DRIVER INSTRUCTION

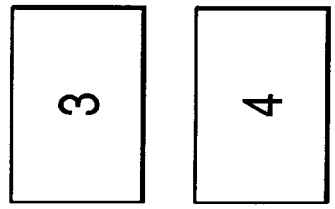

(BINDING DIRECTION)

FIG. 16D
IN CASE WHERE OPERATION IS CONTROLLED NOT TO OBEY ROTATION DESIGNATION CONCERNING PREDETERMINED PAGE

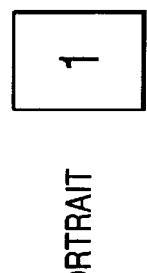
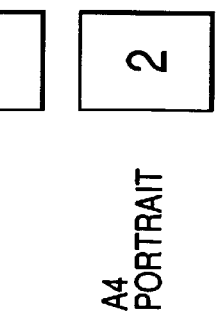

(BINDING DIRECTION)

FIG. 17A
FORMED DOCUMENTS

| A4 LANDSCAPE | 1 |
| A4 LANDSCAPE | 2 |
| A3 PORTRAIT | 3 |
| A3 PORTRAIT | 4 |

FIG. 17B
DRIVER SETTING
[DOUBLE-FACE LONG EDGE BINDING]
(LONG EDGE BINDING DOUBLE-FACE MODE)

DRIVER INSTRUCTION

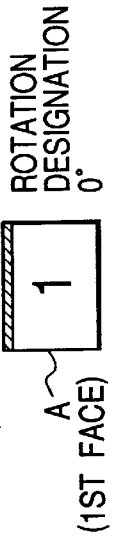

(BINDING DIRECTION) — ROTATION DESIGNATION 0° — A (1ST FACE) — 1

ROTATION DESIGNATION 180° — A (2ND FACE) — 2

(BINDING DIRECTION)

B (1ST FACE) — ROTATION DESIGNATION 0° — 3 (BINDING DIRECTION)

ROTATION DESIGNATION 0° — (2ND FACE) B — 4 (BINDING DIRECTION)

(RECORDING SHEET A: SHORT EDGE FEED)
(RECORDING SHEET B: LONG EDGE FEED)

FIG. 17C
IN CASE WHERE OUTPUT IS PERFORMED ACCORDING TO DRIVER INSTRUCTION

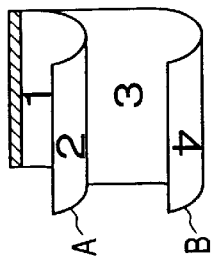

(BINDING DIRECTION)

FIG. 17D
IN CASE WHERE OPERATION IS CONTROLLED NOT TO OBEY ROTATION DESIGNATION CONCERNING PREDETERMINED PAGE (BINDING DIRECTION)

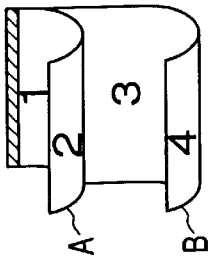

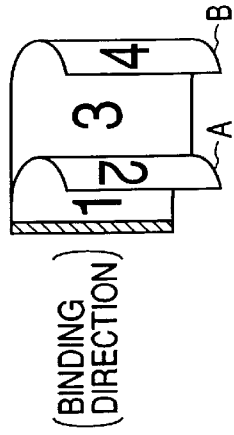
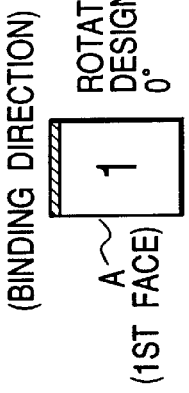
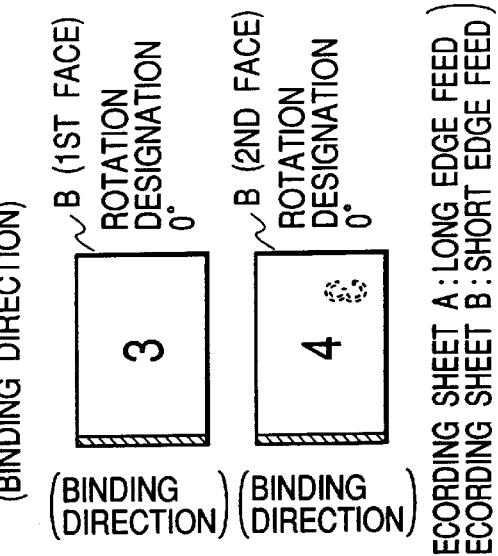

FIG. 18A
FORMED DOCUMENTS

A4 PORTRAIT 1

A4 PORTRAIT 2

A3 LANDSCAPE 3

A3 LANDSCAPE 4

FIG. 18B
DRIVER SETTING
(DOUBLE-FACE SHORT EDGE BINDING
(SHORT EDGE BINDING DOUBLE-FACE MODE))

DRIVER INSTRUCTION
(BINDING DIRECTION)

A (1ST FACE) — ROTATION DESIGNATION 0°  — 1

A (2ND FACE) — ROTATION DESIGNATION 180° — 2

(BINDING DIRECTION)

B (1ST FACE) ROTATION DESIGNATION 0° — 3 (BINDING DIRECTION)

B (2ND FACE) ROTATION DESIGNATION 0° — 4 (BINDING DIRECTION)

(RECORDING SHEET A: LONG EDGE FEED
RECORDING SHEET B: SHORT EDGE FEED)

FIG. 18C
IN CASE WHERE OUTPUT IS PERFORMED ACCORDING TO DRIVER INSTRUCTION (BINDING DIRECTION)

FIG. 18D
IN CASE WHERE OPERATION IS CONTROLLED NOT TO OBEY ROTATION DESIGNATION CONCERNING PREDETERMINED PAGE (BINDING DIRECTION)

FIG. 19A

FORMED DOCUMENTS

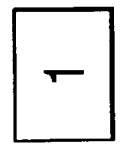 A4 LANDSCAPE

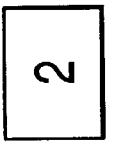 A4 LANDSCAPE

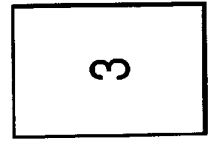 A3 PORTRAIT

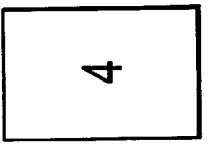 A3 PORTRAIT

FIG. 19B

DRIVER SETTING
[DOUBLE-FACE SHORT EDGE BINDING
(SHORT EDGE BINDING DOUBLE-FACE MODE)]

DRIVER INSTRUCTION

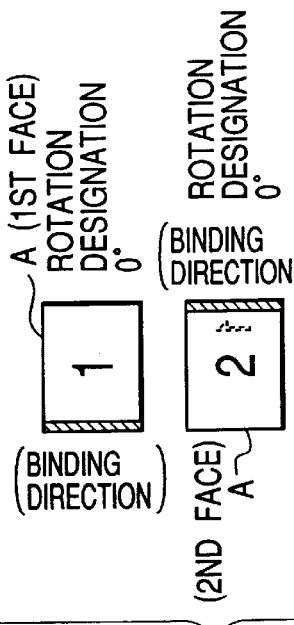

A (1ST FACE) ROTATION DESIGNATION 0°
(BINDING DIRECTION)
(2ND FACE) A ROTATION DESIGNATION 0°

B (1ST FACE) ROTATION DESIGNATION 0°
B (2ND FACE) ROTATION DESIGNATION 180°
(BINDING DIRECTION)

(RECORDING SHEET A: SHORT EDGE FEED
RECORDING SHEET B: LONG EDGE FEED)

FIG. 19C

IN CASE WHERE OUTPUT IS PERFORMED ACCORDING TO DRIVER INSTRUCTION

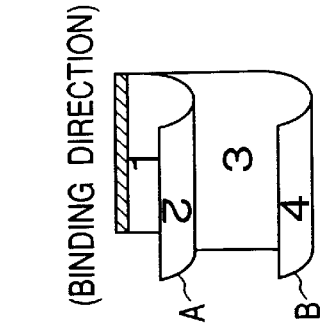

(BINDING DIRECTION)

FIG. 19D

IN CASE WHERE OPERATION IS CONTROLLED NOT TO OBEY ROTATION DESIGNATION CONCERNING PREDETERMINED PAGE

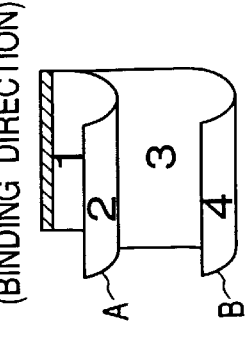

(BINDING DIRECTION)

SHEET BINDING SYSTEM FOR AN IMAGE FORMING APPARATUS

BACKGROUND OF THE INVENTION

1. Field of the Invention

The present invention relates to an image formation apparatus for designating double-face print to image information and performing double-face image formation on a fed recording medium, a method for controlling the image formation apparatus, and a method for controlling image data rotation.

2. Related Background Art

Conventionally, as an image formation apparatus of the above type, there has been proposed the apparatus capable of performing a finishing operation including a sorting process, a stapling process and the like. Some of these apparatuses have been already commercially available. In a case where a computer performs printing by using such the image formation apparatus, it is possible on a computer screen to designate a finishing function (including sorting function, stapling function and the like) and a double-face mode (including later-described long edge binding double-face mode in FIG. 9A, later-described short edge binding double-face mode in FIG. 9B and the like), and then perform double-face output.

Hereinafter, the double-face modes, drawing directions, sheet (or paper) feed directions will be explained with reference to FIGS. 9A, 9B, 10A, 10B, 11A and 11B.

Each of FIGS. 9A and 9B is the diagram showing the relation between the double-face mode and an image formation direction. FIG. 9A corresponds to the long edge binding double-face mode, and FIG. 9B corresponds to the short edge binding double-face mode.

In the long edge binding double-face mode shown in FIG. 9A, double-face print is performed such that the image directions on the front and back faces of the sheet are identical with each other in the state that the sheet stands.

On the other hand, in the short edge binding double-face mode shown in FIG. 9B, the double-face print is performed such that the image direction on the front face of the sheet is opposite (by 180°) to that on the back face thereof in the state the sheet stands.

Each of FIGS. 10A and 10B is the diagram showing the relation between the sheet direction and the image direction on the sheet. FIG. 10A corresponds to the drawing in a portrait direction (referred as portrait drawing hereinafter), and FIG. 10B corresponds to the drawing in a landscape direction (referred as landscape drawing hereinafter).

Each of FIGS. 11A and 11B is the diagram showing the relation between the sheet direction and a sheet feed direction. FIG. 11A corresponds to the long edge feed, and FIG. 11B corresponds to the short edge feed.

In such the conventional image formation apparatus, in case of controlling the double-face output, the designation of the double-face mode such as the long edge binding double-face mode or the short edge binding double-face mode is performed to the entire document to be outputted. However, since it is possible to designate the sheet sizes (e.g., A3, A4, B4, B5 and the like) and the drawing directions (e.g., portrait drawing and landscape drawing) for each page, it is possible to mixedly designate the drawing for the plural different-size sheets in the single document.

For this reason, in the conventional image formation apparatus, there sometimes occurs that binding directions conflict with others among plural mixed sheet sizes if the double-face output is designated for the entire document.

Hereinafter, it will be explained a case where the A4-size portrait drawing and the A3-size landscape drawing mixedly exist within a single document, with reference to FIGS. 12A, 12B, 13A, 13B, 14A and 14B.

FIGS. 12A and 12B are the diagrams showing the output result obtained when the portrait drawing is performed to the first to fourth pages of the A4-size long edge feed sheets. FIG. 12A shows the state that the output results are bound into a sheaf, and FIG. 12B shows the state that the second and third pages of the output results are spread.

FIGS. 13A and 13B are the diagrams showing the output result obtained when the landscape drawing is performed to the fifth to eighth pages of the A3-size short edge feed sheets. FIG. 13A shows the state that the output results are bound into a sheaf, and FIG. 13B shows the state that the sixth and seventh pages of the output results are spread.

FIGS. 14A and 14B are the diagrams showing the state that the output result of the first to fourth pages of the A4-size long edge feed sheets in the portrait drawing of FIGS. 12A and 12B and the output result of the fifth to eighth pages of the A3-size short edge feed sheets in the landscape drawing of FIGS. 13A and 13B are bound into a sheaf. FIG. 14A shows the state that these output results are bound into the sheaf, and FIG. 14B shows the state that the sixth and seventh pages of the output results are spread. It FIG. 14B, the sixth page is bound upside down.

As shown in FIGS. 14A and 14B, the A4-size sheet is fed in a long edge feed manner and subjected to the portrait drawing, the A3-size sheet is fed in the short edge feed manner and subjected to the landscape drawing. The fed sheets are then bound into the sheaf. In this case, the drawing directions on the front and back faces of the A4-size sheet is different from those on the front and back faces of the A3-size sheet.

This is because the drawing in the long edge binding double-face mode is designated for both the A3- and A4-size sheets. As shown in FIG. 14B, the sixth and eighth pages (i.e., even pages) of the A3-size sheets are thus bound upside down.

On the other hand, it will explained a case where the short edge binding double-face mode is designated to the document and further the A4-size portrait drawing and the A3-size landscape drawing mixedly exist within the single document.

In this case, since the drawing in the short edge binding double-face mode is designated to both the A3- and A4-size sheets, the second page (i.e., even page) of the A4-size sheet is bound upside down.

As above, in the conventional image formation apparatus, in the case where the different sheet sizes mixedly exist, if the double-face binding direction is designated for the entire document irrespective of the different sizes, there sometimes occurs that the binding directions resultingly conflict with others.

SUMMARY OF THE INVENTION

An object of the present invention is to provide an image formation apparatus capable of solving the above problems, a method for controlling the image formation apparatus, and a method for controlling image data rotation.

Another object of the present invention is to provide an image formation apparatus capable of obtaining an optimum double-face print output result in which binding directions are coordinated even if plural sheet sizes mixedly exist within a single document, a method for controlling the image formation apparatus, and a method for controlling image data rotation.

Other objects and features of the present invention will become apparent from the following detailed description and the attached drawings.

BRIEF DESCRIPTION OF THE DRAWINGS

FIGS. 16A, 16B, 16C and 16D are views for explaining a process to be performed when various modes are selected;

FIGS. 17A, 17B, 17C and 17D are views for explaining a process to be performed when various modes are selected;

FIGS. 18A, 18B, 18C and 18D are views for explaining a process to be performed when various modes are selected; and FIGS. 19A, 19B, 19C and 19D are views for explaining a process to be performed when various modes are selected.

DETAILED DESCRIPTION OF PREFERRED EMBODIMENT

Figure 1:
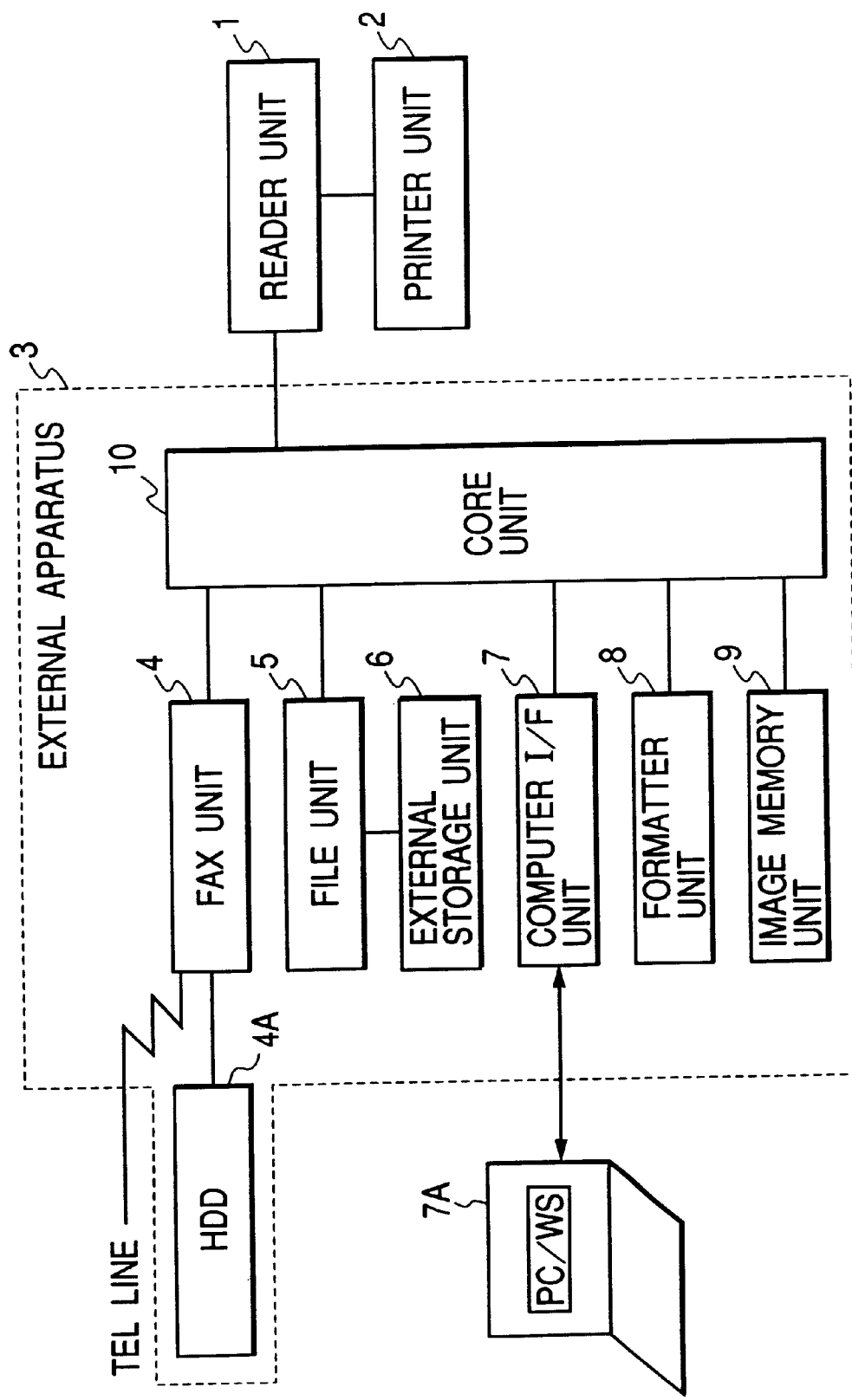
FIG. 1 is a block diagram for explaining a structure of an image formation apparatus according to one embodiment of the present invention.

FIG. 1 is a block diagram for explaining the structure of an image formation apparatus according to the embodiment of the present invention.

In the drawing, numeral 1 denotes an image input unit (referred as reader unit hereinafter) which reads an original and converts a read original image into image data. Numeral 2 denotes an image output unit (referred as printer unit hereinafter) which has plural kinds of recording paper cassettes and outputs the image data read by the reader unit 1 onto a sheet of recording paper (referred as recording sheet hereinafter) as a visible image in response to a print instruction. Numeral 3 denotes an external apparatus which has various functions, electrically connects with the reader unit 1 (by using cable), and controls various signals and functions.

In the external apparatus 3, numeral 4 denotes a facsimile unit which performs facsimile transmission and reception through a telephone line. Numeral 4A denotes a hard disk (HDD) which is connected to the facsimile unit 4 and can store various transmission and reception data of the unit 4. Numeral 5 denotes a file unit which converts various original information into electrical signals and then stores these signals into an external storage unit 6 such as a magneto-optical disk or the like. Numeral-7 denotes a computer interface unit which performs communication to a connected personal computer/work station (referred as PC/WS hereinafter) 7A.

Numeral 8 denotes a formatter unit which expands code information transferred from the PC/WS 7A into image information to form the visible image. Numeral 9 denotes an image memory unit which stores the information sent from the reader unit 1 and temporarily stores the information sent from the PC/WS 7A. Numeral 10 denotes a core unit which controls the various signals and functions. That is, the core unit 10 comprehensively controls the external apparatus 3.

Figure 2:
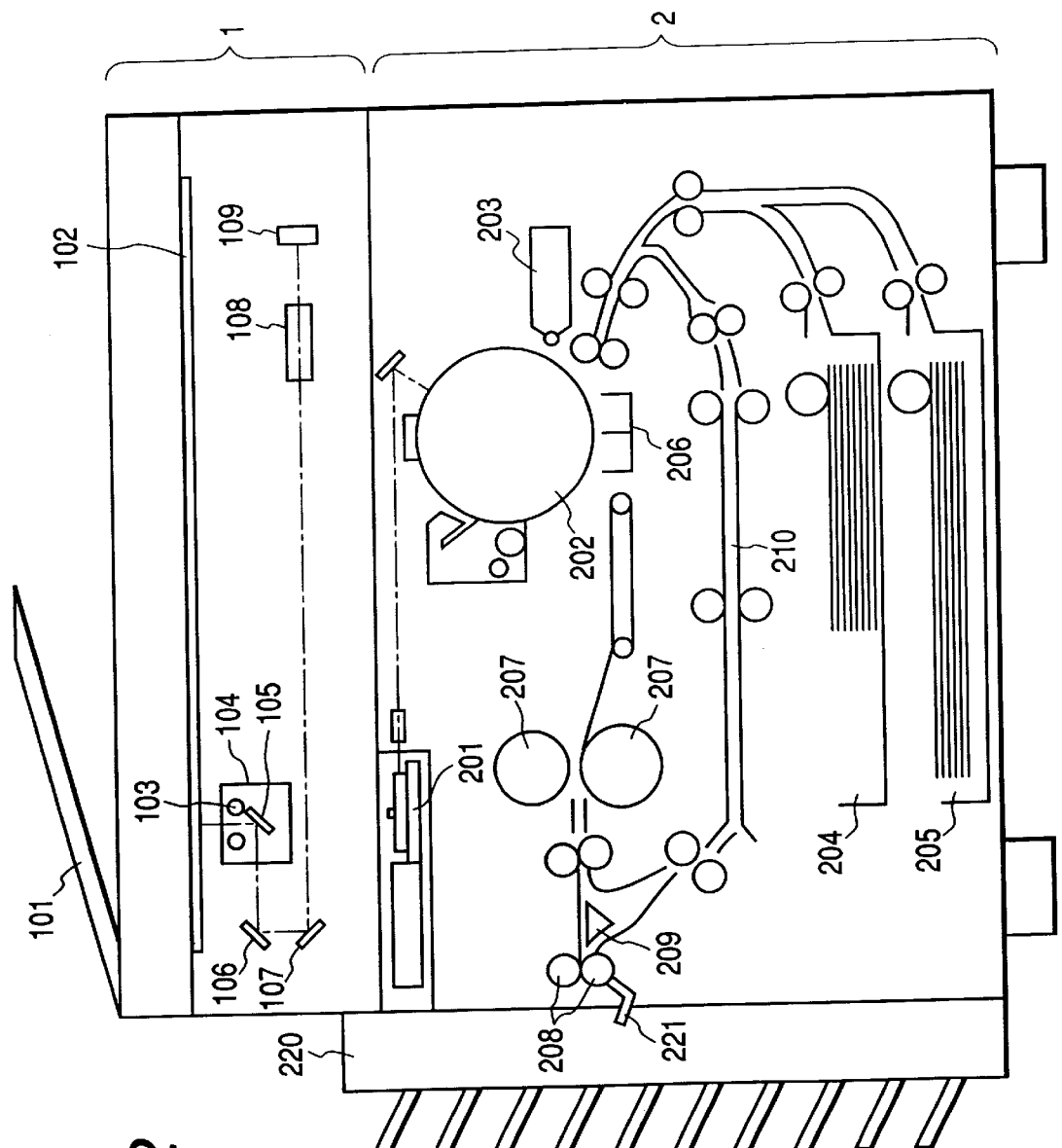
FIG. 2 is a sectional view for explaining a structures of reader and printer units of the image formation apparatus shown in FIG. 1.

FIG. 2 is a sectional view for explaining the structures of the reader unit 1 and the printer unit 2 of the image formation apparatus shown in FIG. 1. In FIG. 2, the same parts as those in FIG. 1 are added with the same reference numerals respectively.

In the reader unit 1, numeral 101 denotes an original feed unit which sequentially feeds one by one the original put on an original mounting board onto a original mounting board glass plate 102. Numeral 104 denotes a scanner unit which moves to irradiate the original placed at the predetermined position on the plate 102 by using a lamp 103. Numeral 109 denotes a CCD image sensor unit (referred as CCD hereinafter) to which reflection light from the original is inputted through a mirrors 105, 106 and 107 and a lens 108. The reflection light from the original irradiated by the CCD 109 is subjected to photoelectric conversion by the reader unit 1, and then converted into R (red), G (green) and B (blue) color electrical signals.

Hereinafter, the operation of each unit will be explained.

The original put on the original mounting board of the original feed unit 101 is fed one by one onto the glass plate 102. If the original reaches the predetermined position on the plate 102, the lamp 103 of the scanner unit 104 is turned on. The unit 104 then moves to irradiate the original. The reflection light from the original is inputted to the CCD 109 through the mirrors 105, 106 and 107 and the lens 108.

In the printer unit 2, numeral 201 denotes an exposure control unit which modulates an image signal inputted to the printer unit 2, converts the modulated signal into an optical signal, and then irradiates the optical signal onto a photosensitive body 202. Numeral 203 denotes a developing unit which develops a latent image formed by the irradiated light on the photosensitive body 202. Numeral 206 denotes a transfer unit. A sheet of transfer paper (referred as transfer sheet hereinafter) is fed from a transfer sheet stack unit 204 or 205 at timing synchronous with the end of the developing unit 203, and the image developed by the unit 203 is transferred onto the fed sheet. Numeral 207 denotes a fixing unit which fixes the image transferred to the transfer sheet. Numeral 208 denotes a paper discharge unit which discharges the transfer sheet subjected to the fixing process by the fixing unit 207, to the outside of the image formation apparatus. Numeral 209 denotes a feed direction change member (referred as flapper hereinafter). In a case where double-face print or overlay print is designated, the transfer sheet is guided into a paper refeed stack unit 210 by shifting the flapper 209 at predetermined timing.

Numeral 220 denotes a sorter which has a sorting function to sort the transfer sheets outputted from the paper discharge unit 208 onto respective bins. On the other hand, if the bin or the sorting function does not operate, the sorter 220 discharges the sheets onto the uppermost bin. The sorter 220 contains a stapler 221 which performs a stapling process to the transfer sheets outputted from the paper discharge unit 208.

Hereinafter, the operation of each unit will be explained.

The image signal inputted to the printer unit 2 is modulated and then converted into the optical signal by the exposure control unit 201, to irradiate the photosensitive body 202. The latent image formed on the photosensitive body 202 by irradiation is developed by the developing unit 203. The transfer sheet is fed from the transfer sheet stack unit 204 or 205 at the timing synchronous with the end of the developing unit 203, and the image developed by the unit 203 is transferred onto the fed sheet by the transfer unit 206. The transferred image is fixed to the sheet by the fixing unit 207, and the sheet is then discharged outward by the discharge unit 208. The transfer sheets outputted from the unit 208 are discharged onto the respective bins of the sorter 220 when the sorting function is operating. On the other hand, the sheets are discharged onto the uppermost bin when the sorting function does not operate.

Subsequently, the method to output the sequentially read images onto the front and back faces of the output sheet will be explained. The output sheet onto which the image has been fixed by the fixing unit 207 is once fed to the discharge unit 208, and the sheet feed direction is reversed. Thus, the sheet is fed to the paper refeed stack unit 210 through the flapper 209. After then, the subsequent original is prepared, and its image is read in the same manner as above. However, since the transfer sheet is again fed from the paper refeed stack unit 210, the two original images can be outputted respectively onto the front and back faces of the identical output paper (i.e., transfer sheet).

Figure 3:
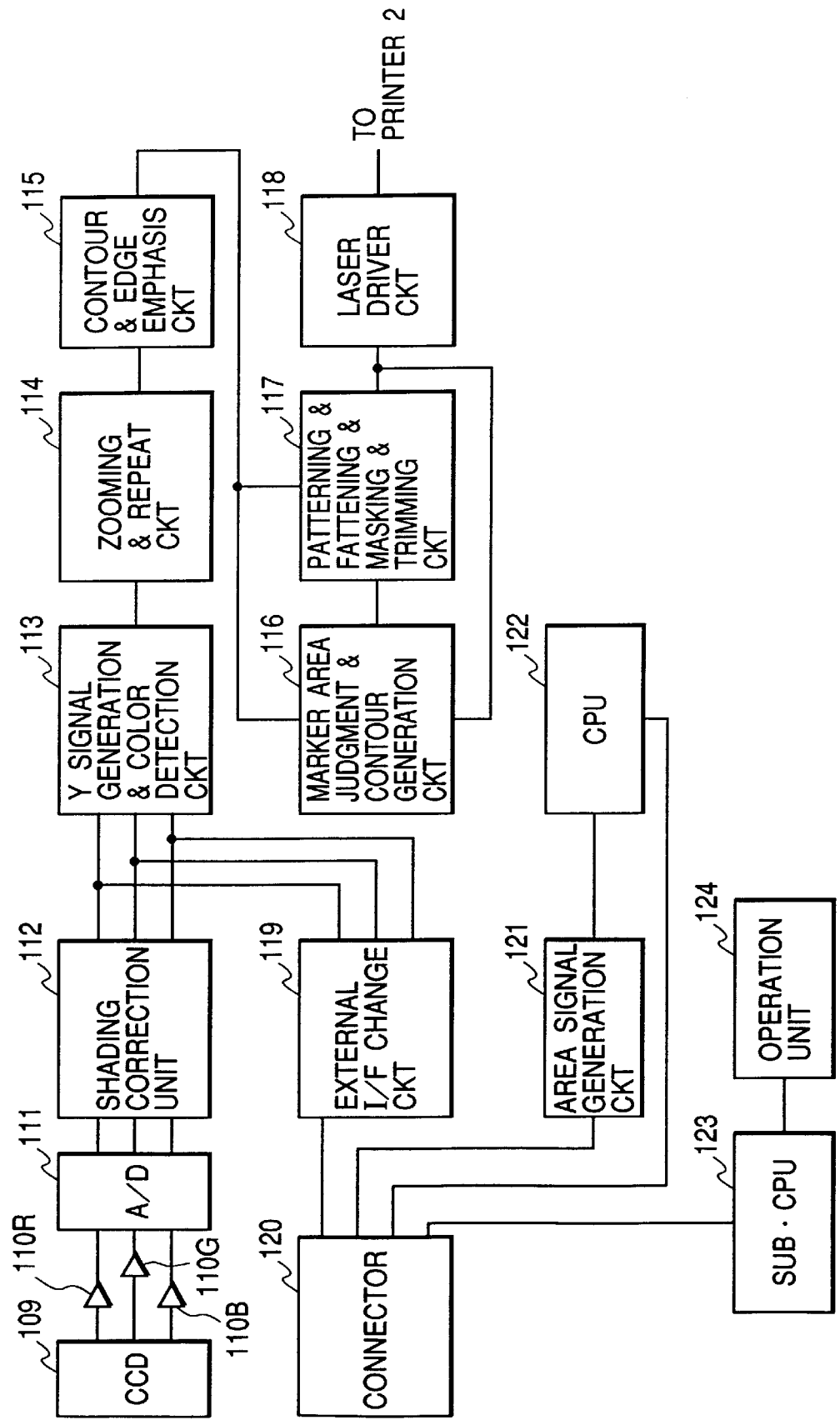
FIG. 3 is a block diagram for explaining a signal process structure of the reader unit of the image formation apparatus shown in FIG. 1.

FIG. 3 is a block diagram for explaining the structure for signal process in the reader unit 1 of the image formation apparatus shown in FIG. 1. In FIG. 3, the same parts as those in FIG. 1 are added with the same reference numerals respectively.

In FIG. 3, numerals 110R, 110G and 110B respectively denote amplifiers. Each amplifier amplifies the color information transferred from the CCD 109 according to an input signal level of an analog-to-digital (A/D) converter 111. The A/D converter 111 converts each color analog information amplified by each of the amplifiers 110R, 110G and 110B into a digital signal. Numeral 112 denotes a shading correction unit which performs a shading correction (i.e., correcting unevenness of light distribution of lamp 103 and unevenness of sensitivity of CCD 109) to the signals outputted from the A/D converter 111. The unit 112 then outputs the corrected signals to an Y (yellow) signal generation and color detection circuit 113 and to an external interface (I/F) change circuit 119.

The Y signal generation and color detection circuit 113 performs calculation to the output signals from the shading correction unit 112 by using a formula "Y=0.3R+0.6G+0.1B" to generate a Y signal, and further performs color detection to output the signals concerning seven colors separated from R, G and B color signals. Numeral 114 denotes a zooming and repeat circuit which performs zooming operations in sub and main scan directions to the signal outputted from the circuit 113, according to scanning speed of the scanner unit 104. In addition, the circuit 114 can repeatedly output the identical image.

Numeral 115 denotes a contour and edge emphasis circuit which emphasizes a high frequency component of the signal sent from the zooming and repeat circuit 114, to perform edge emphasis. Furthermore, the circuit 115 generates and outputs contour information to a marker area judgment and contour generation circuit 116 and to a patterning, fattening, masking and trimming circuit 117.

The marker area judgment and contour generation circuit 116 reads the portion on the original written by a designated-color marker pen, and generates marker contour information. The patterning, fattening, masking and trimming circuit 117 performs fattening, masking and trimming based on the contour information sent from the circuit 116. Furthermore, the circuit 117 performs patterning based on the color detection signal sent from the Y signal generation and color detection circuit 113.

Numeral 118 denotes a laser driver circuit which converts the signal outputted from the patterning, fattening, masking and trimming circuit 117 into the signal to be used for driving a laser. The signal outputted from the circuit 118 is inputted to the printer unit 2, and thus the visible image is formed by the printer unit 2.

The external I/F change circuit 119 interfaces with the external apparatus 3. When the image information is outputted from the reader unit 1 to the external apparatus 3, the circuit 119 outputs the image information sent from the circuit 117 to a connector 120. Furthermore, when the image information sent from the external apparatus 3 is inputted to the reader unit 1, the circuit 119 inputs the image information sent from the connector 120 to the Y signal generation and color detection circuit 113.

Numeral 122 denotes a CPU which instructs the above various image processes, and comprehensively controls the reader unit 1. Numeral 121 denotes an area signal generation circuit which generates various timing signals necessary in the above image processes, on the basis of the value set by the CPU 122.

Furthermore, the CPU 122 communicates with the external apparatus 3 by using a contained communication function. Numeral 123 denotes a sub CPU which controls an operation unit 124, and communicates with the external apparatus 3 by using a contained communication function.

Figure 4:
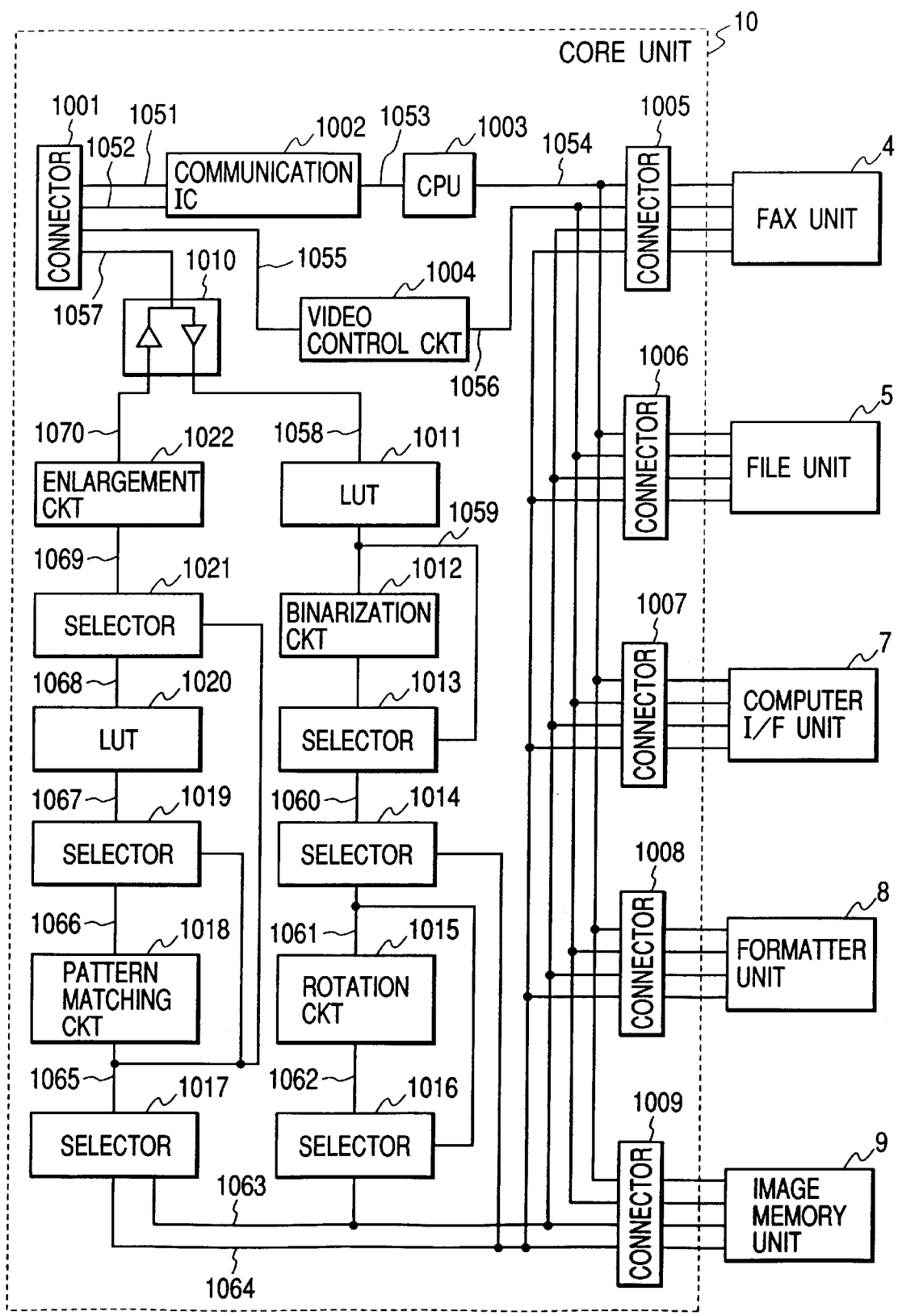
FIG. 4 is a block diagram for explaining a structure and an operation of a core unit of the image formation apparatus shown in FIG. 1.

FIG. 4 is a block diagram for explaining the structure and the operation of the core unit 10 in the image formation apparatus shown in FIG. 1. In FIG. 4, the same parts as those in FIG. 1 are added with the same reference numerals respectively.

In FIG. 3, a connector 1001 of the core unit 10 is connected to the connector 120 of the reader unit 1 by means of a cable. The connector 1001 contains four kinds of signal lines 1051, 1052, 1057 and 1055. The signal line 1051 is used to communicate with the CPU 122 of the reader unit 1, the signal line 1052 is used to communicate with the sub CPU 123 of the reader unit 1, the signal line 1057 is used to send an eight-bit multivalue video signal, and the signal line 1055 is used to control the video signal.

Furthermore, the signal lines 1051 and 1052 are used in a communication protocol process by a communication IC 1002, whereby communication information is sent to a CPU 1003 through a CPU bus 1053. The CPU 1003 contains a read-only memory (ROM) storing control programs and a random access memory (RAM) acting as a working area, and comprehensively controls the respective components in the core unit 10 according to the control programs in the ROM (described later).

Since the signal line 1057 is the two-way video signal line, the core unit 10 can receive/output information from/to the reader unit 1 through the line 1057. Furthermore, the signal line 1057 is connected to a buffer 1010. At the buffer 1010, the two-way signal line 1057 is divided into two one-way video signal lines 1058 and 1070. The signal line 1058 is used to output the eight-bit multivalue video signal sent from the reader unit 1 to a next-stage look-up table unit (referred as LUT hereinafter) 1011.

The LUT 1011 converts the image information sent from the reader unit 1 into a desired value by using a look-up table. The signal outputted from the LUT 1011 is inputted to a binarization circuit 1012 or a selector 1013 through an output signal line 1059. The binarization circuit 1012 has first, second and third binarization functions. Here, the first binarization function is to simply binarize the multivalue signal of the signal line 1059 on the basis of a fixed slice level. On the other hand, in the second binarization function, the slice level at a pixel varies with the distance from a remarked (or objective) pixel. The third binarization function is to binarize the multivalue signal by using an error diffusion method.

If the binarized information is "0", it is converted into the multivalue signal "00H", while if the binarized information is "1", it is converted into the multivalue signal "FFH". The converted signal is then inputted to the next-stage selector 1013. Thus, the selector 1013 selects either one of the signal from the LUT 1011 and the signal outputted from the binarization circuit 1012.

The signal of an output signal line 1060 from the selector 1013 is inputted to a selector 1014. On the basis of the instruction from the CPU 1003, the selector 1014 selects the signal (of signal line 1064) which is obtained based on video signals inputted to the core unit 10 from the facsimile unit 4, the file unit 5, the computer I/F unit 7, the formatter unit 8 and the image memory unit 9 respectively through connectors 1005, 1006, 1007, 1008 and 1009, and also selects the signal of the output signal line 1060 from the selector 1013.

The signal of an output signal line 1061 from the selector 1014 is inputted to a rotation circuit 1015 or a selector 1016. The rotation circuit 1015 has the function to rotate the inputted image signal by "+90°", "−90°" or "+180°". The information outputted from the reader unit 1 is converted into the binary signal by the binarization circuit 1012, and the obtained binary signal is then stored in the rotation circuit 1015 as the information sent from the reader unit 1.

Subsequently, on the basis of the instruction from the CPU 1003, the rotation circuit 1015 rotates and reads the stored information. The selector 1016 selects either of the signals of an output signal line 1062 and the input signal line 1061 of the rotation circuit 1015, and then outputs the selected signal to the connector 1005 for the facsimile unit 4, the connector 1006 for the file unit 5, the connector 1007 for the computer I/F unit 7, the connector 1008 for the formatter unit 8, the connector 1009 for the image memory unit 9, and a selector 1017, as the signal of a signal line 1063.

The signal line 1063 is the synchronous eight-bit one-way video bus for transferring the image information from the core unit 10 to the facsimile unit 4, the file unit 5, the computer I/F unit 7, the formatter unit 8 and the image memory unit 9. The signal line 1064 is the synchronous eight-bit one-way video bus for transferring the image information from the facsimile unit 4, the file unit 5, the computer I/F unit 7, the formatter unit 8 and the image memory unit 9.

In the core unit 10, a video control circuit 1004 controls the signal lines (or synchronous buses) 1063 and 1064 on the basis of the signal of an output signal line 1056 from the video control circuit 1004. In addition, a signal line 1054 is connected to the connectors 1005 to 1009 respectively. The signal line 1054 is the two-way 16-bit CPU bus for handling data and command asynchronously.

By the video buses 1063 and 1064 and the CPU bus 1054, the core unit 10 can transfer/receive the information to/from the facsimile unit 4, the file unit 5, the computer I/F unit 7, the formatter unit 8 and the image memory unit 9 respectively.

The signal of the signal line 1064 from the facsimile unit 4, the file unit 5, the computer I/F unit 7, the formatter unit 8 and the image memory unit 9 is inputted to the selectors 1014 and 1017. The selector 1014 then inputs the signal of the signal line 1064 to the next-stage rotation circuit 1015 on the basis of the instruction from the CPU 1003.

The selector 1017 selects either of the signals of the signal lines 1063 and 1064 on the basis of the instruction from the CPU 1003. The signal of an output signal line 1065 from the selector 1017 is inputted to a pattern matching circuit 1018 and selectors 1019 and 1021. The pattern matching circuit 1018 performs pattern matching to the signal of the input signal line 1065 by using a predetermined pattern. If the pattern of the signal coincides with the predetermined pattern, the circuit 1018 outputs the predetermined multivalue signal to a signal line 1066. On the other hand, if the pattern of the signal does not coincide with the predetermined pattern, the circuit 1018 outputs the signal of the signal line 1065 to the signal line 1066 as it is.

The selector 1019 selects either of the signals of the signal lines 1065 and 1066 on the basis of the instruction from the CPU 1003. The output signal from the selector 1019 is then inputted to a next-stage look-up table unit (referred as LUT hereinafter) 1020 through a signal line 1067. In case of outputting the image information to the printer unit 2, the LUT 1020 converts the signal of the input signal line 1067 into the information according to the characteristic of the printer unit 2.

The selector 1021 selects either the signal of an output signal line 1068 from the LUT 1020 or the signal of the signal line 1065 on the basis of the instruction from the CPU 1003. The output signal from the selector 1021 is inputted to a next-stage enlargement circuit 1022 through a signal line 1069. The enlargement circuit 1022 can set enlargement magnification independently in X- and Y-directions of the image on the basis of the instruction from the CPU 1003.

The enlargement circuit 1022 enlarges the image in a primary linear interpolation method. The output signal from the enlargement circuit 1022 is then inputted to the buffer 1010 through the signal line 1070. The signal inputted in the buffer 1010 is sent to the printer unit 2 through the two-way signal line 1057 and the connector 1001, and then printed out by the printer unit 2.

Figure 5:
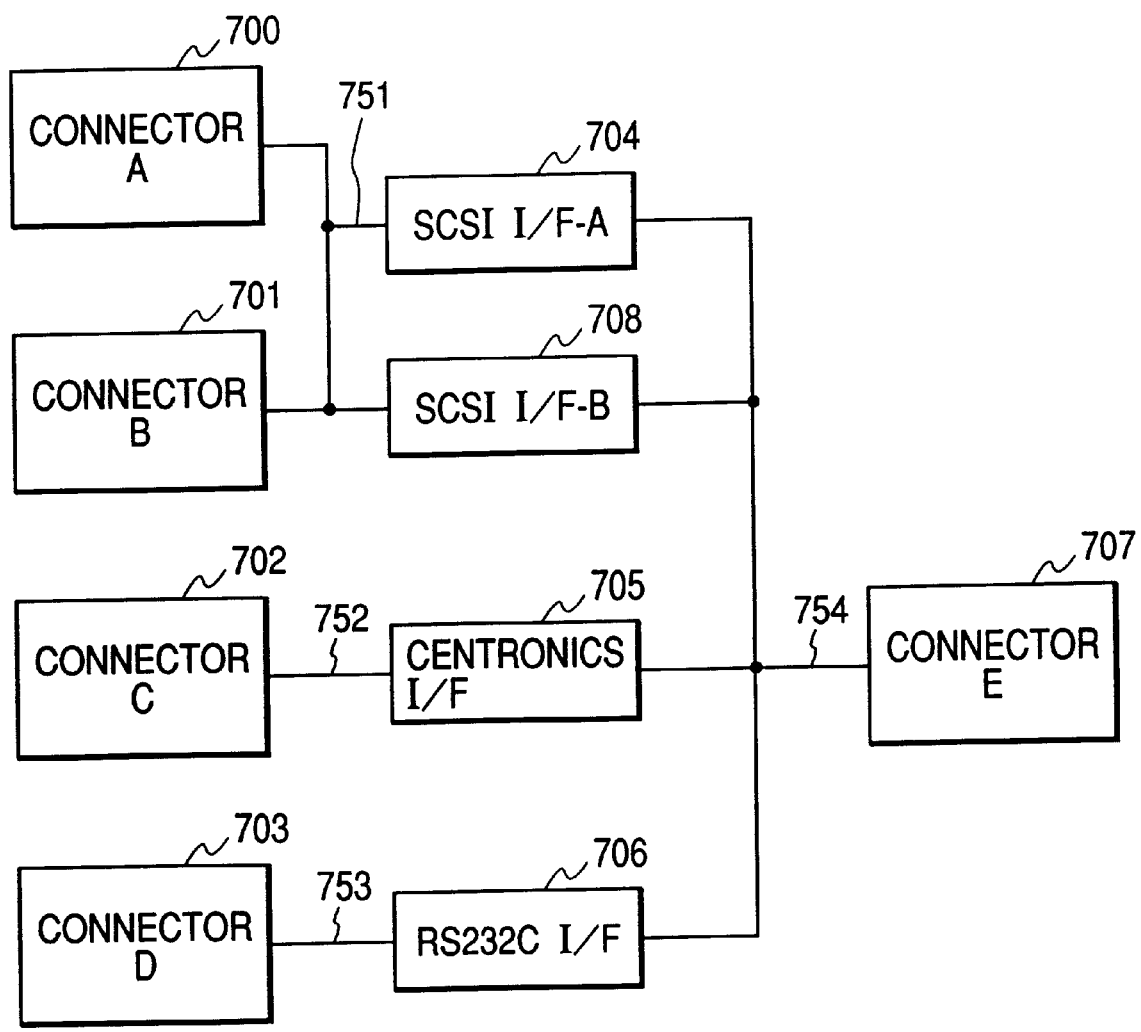
FIG. 5 is a block diagram for explaining a structure of a computer interface unit of the image formation apparatus shown in FIG. 1.

FIG. 5 is a block diagram for explaining the structure of the computer I/F unit 7 in the image formation apparatus of FIG. 1.

In FIG. 5, each of numerals 704 and 708 denotes a small computer system interface (referred as SCSI I/F hereinafter), numeral 705 denotes a Centronics interface (referred as Centronics I/F hereinafter), and numeral 706 denotes an RS232C interface (referred as RS232C I/F hereinafter).

Each of numerals 700, 701, 702 and 703 denotes a connector for the externally connected unit (e.g., PC/WS 7A). The connectors 700 and 701 are connected to the SCSI I/Fs 704 and 708 through a signal line 751, the connector 702 is connected to the Centronics I/F 705 through a signal line 702, and the connector 703 is connected to the RS232C I/F 706 through a signal line 753. Numeral 707 denotes a connector which is connected to the core unit 10. The connector 707 is also connected to the I/Fs 704, 708, 705 and 706 through a signal line 754. The information from the computer I/F unit 7 is transferred to the core unit 10 through the connector 707.

Hereinafter, the flow of the signal between the core unit 10 and each unit will be explained.

[operation of core unit 10 based on information transfer between core unit 10 and facsimile unit 10]

Initially, a case where the information is outputted from the core unit 10 to the facsimile unit 4 will be explained.

The CPU 1003 of the core unit 10 communicates with the CPU 122 of the reader unit 1 through the communication IC 1002 to issue the original scan instruction to the reader unit 1. In the reader unit 1, the original is scanned by the scanner unit 104 on the basis of this instruction, and the image information is then outputted to the connector 120. Since the reader unit 1 and the external apparatus 3 are connected with each other by means of the cable, the information from the reader unit 1 is inputted to the connector 1001 of the core unit 10.

The information inputted to the connector 1001 of the core unit 10 is then inputted to the buffer 1010 through the multivalue eight-bit signal line 1057. On the basis of the instruction from the CPU 1003, the buffer circuit 1010 transfers the signal of the signal line 1057 as the one-way signal to the LUT 1011 through the signal line 1058. In the LUT 1011, the image information from the reader unit 1 is converted into the desired value by using the look-up table. Thus, for example, it is possible to skip the background on the original.

The output signal from the LUT 1011 is then inputted to the next-stage binarization circuit 1012 through the output signal line 1059, and the circuit 1012 converts the eight-bit multivalue signal of the signal line 1059 into the binarization signal. If the binarized signal is "0", the circuit 1012 further converts it into the multivalue signal "00H". On the other hand, if the binarized signal is "1", the circuit 1012 further converts it into the multivalue signal "FFH". The output signal from the binarization circuit 1012 is then inputted to the rotation circuit 1015 or the selector 1016 through the selectors 1013 and 1014.

Also, the output signal from the rotation circuit 1015 is inputted to the selector 1016 through the signal line 1062. Thus, the selector 1016 selects either of the signals of the signal lines 1061 and 1062. Such the selection is determined according as the CPU 1003 communicates with the facsimile unit 4 through the CPU bus 1054.

The signal of the output signal line 1063 from the selector 1016 is sent to the facsimile unit 4 through the connector 1005. The facsimile unit 4 can store the received information also in the HDD 4A.

Subsequently, a case where the core unit 10 receives the information from the facsimile unit 4 will be explained.

The image information from the facsimile unit 4 is transferred to the signal line 1064 through the connector 1005 of the core unit 10. The signal of the signal line 1064 is inputted to the selectors 1014 and 1017. In case of rotating the image at the facsimile reception and then outputting it to the printer unit 2 on the basis of the instruction from the CPU 1003 of the core unit 10, the signal of the signal line 1064 inputted to the selector 1014 is subjected to the rotation process by the rotation circuit 1015. The signal of the output signal line 1062 from the rotation circuit 1015 is inputted to the pattern matching circuit 1018 through the selectors 1016 and 1017.

On the other hand, in case of outputting the image at the facsimile reception to the printer unit 2 as it is on the basis of the instruction from the CPU 1003, the signal of the signal line 1064 inputted to the selector 1017 is inputted to the pattern matching circuit 1018.

The pattern matching circuit 1018 has the function to smooth unevenness of the facsimile-received image. The signal subjected to the pattern matching is then inputted to the LUT 1020 through the selector 1019. In order to output the facsimile-received image to the printer unit 2 at desired density, the look-up table in the LUT 1020 is changeable by the CPU 1003.

The signal of the output signal line 1068 from the LUT 1020 is inputted to the enlargement circuit 1022 through the selector 1021. The enlargement circuit 1022 performs the enlargement process to the eight-bit multivalue signal having the two kinds of values ("00H" and "FFH") in the primary linear interpolation method. The eight-bit multivalue signals having the values "00" to "FF" outputted from the enlargement circuit 1022 are then transferred to the reader unit 1 through the buffer 1010 and the connector 1001.

The reader unit 1 transfers the received signal to the external I/F change circuit 119 through the connector 120. The external I/F change circuit 119 then transfers the signal from the facsimile unit 4 to the Y signal generation and color detection circuit 113. The output signal from the circuit 113 is subjected to the above-described process and then outputted to the printer unit 2, whereby the image formation is performed on the output sheet by the printer unit 2.

[operation of core unit 10 based on information transfer between core unit 10 and file unit 5]

Hereinafter, a case where the information is outputted from the core unit 10 to the file unit 5 will be explained.

The CPU 1003 of the core unit 10 communicates with the CPU 122 of the reader unit 1 through the communication IC 1002 to issue the original scan instruction to the reader unit 1. In the reader unit 1, the original is scanned by the scanner unit 104 on the basis of this instruction, and the image information is then outputted to the connector 120.

Since the reader unit 1 and the external apparatus 3 are connected to each other by means of the cable, the information from the reader unit 1 is inputted to the connector 1001 of the core unit 10. The image information inputted to the connector 1001 is then inputted to the one-way signal line 1058 through the buffer 1010. The eight-bit multivalue signal of the signal line 1058 is converted into the desired signal by the LUT 1011, and the output signal from the LUT 1011 is inputted to the connector 1006 through the signal line 1059 and the selectors 1013, 1014 and 1016.

That is, the eight-bit multivalue signal is transferred to the file unit 5 as it is, without using the functions of the binarization circuit 1012 and the rotation circuit 1015. When the filing of the binarization signal is performed through the communication between the file unit 5 and the CPU 1003, the functions of the binarization circuit 1012 and the rotation circuit 1015 are used. Since the binarization process and the rotation process are substantially the same as those in case of the above-described facsimile unit 4, the explanation thereof is omitted.

Subsequently, a case where the information from the file unit 5 is received by the core unit 10 will be explained.

Initially, the image information from the file unit 5 is inputted to the selector 1014 or 1017 through the connector 1006 and the signal line 1064. That is, it is possible to input the information to the selector 1017 in case of filing the eight-bit multivalue signal, while it is possible to input the information to the selector 1014 or 1017 in case of filing the binary information. Since the operation of the binary signal filing is substantially the same as that in case of the facsimile unit 4, the explanation thereof is omitted.

On the other hand, in case of filing the multivalue signal, the output signal from the selector 1017 is inputted to the LUT 1020 through the signal line 1065 and the selector 1019, whereby the multivalue signal is binarized. The LUT 1020 forms the look-up table according to the desired print density, on the basis of the instruction from the CPU 1003. The output signal from the LUT 1020 is then inputted to the enlargement circuit 1022 through the signal line 1068 and the selector 1021.

The eight-bit multivalue signal enlarged at the desired enlargement magnification by the enlargement circuit 1022 is sent to the signal line 1070, and then transferred to the reader unit 1 through the buffer 1010 and the connector 1001. Like the above-described facsimile unit 4, the information transferred from the file unit 5 to the reader unit 1 is inputted to the printer unit 2, whereby the image formation is performed on the output sheet by the printer unit 2.

[operation of core unit 10 based on information transfer between core unit 10 and computer I/F unit 7]

The computer I/F unit 7 interfaces with the PC/WS 7A connected to the external apparatus 3. The information transferred to the core unit 10 through the connector 707 of the computer I/F unit 7 is further transferred to the CPU 1003 through the connector 1007 and the data bus 1054. The CPU 1003 performs various control based on the contents of the received information.

[operation of core unit 10 based on information transfer between core unit 10 and formatter unit 8]

The formatter unit 8 has the function to expand the command data such as a document file or the like of the PC/WS 7A sent from the computer I/F unit 7 through the core unit 10, into the image data.

If the CPU 1003 of the core unit 10 judges that the data sent from the computer I/F unit 7 through the data bus 1054 is the data concerning the formatter unit 8, such the data is transferred to the formatter unit 8 through the connector 1008. The formatter unit 8 expands the transferred data in the memory, as a meaningful image such as a character, a drawing or the like.

Figure 6:
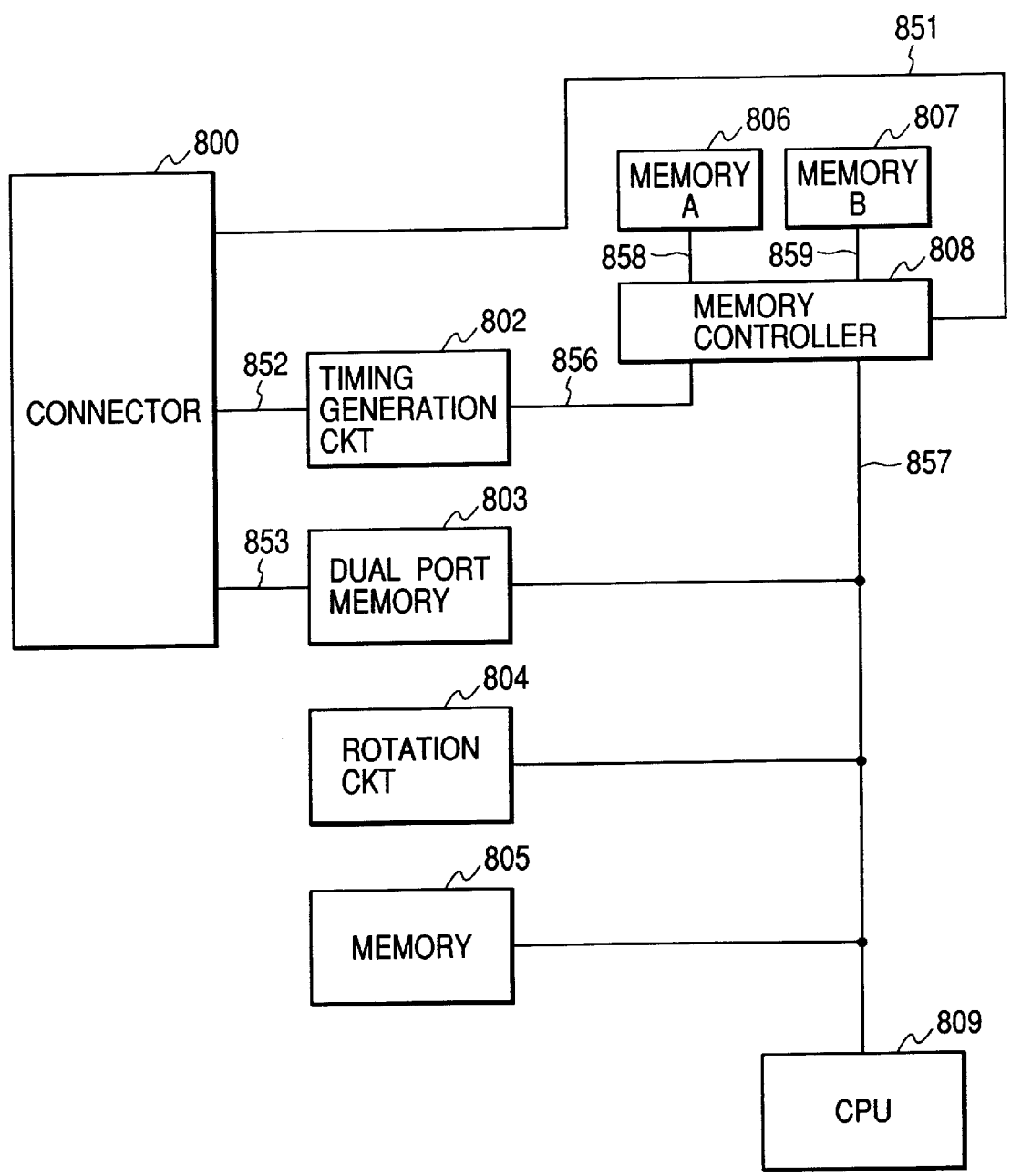
FIG. 6 is a block diagram for explaining a structure of a formatter unit 8 of the image formation apparatus shown in FIG. 1.

FIG. 6 is a block diagram for explaining the structure of the formatter unit 8 of the image formation apparatus shown in FIG. 1.

In FIG. 6, numeral 800 denotes a connector which is connected to the core unit 10. Numeral 803 denotes a dual port memory which stores the code data of the PS/WS 7A transferred from the connector 800 through a data bus line 853. In other words, the memory 803 stores the code data generated by the PS/WS 7A and transferred through the computer I/F unit 7 and the core unit 10. Numeral 809 denotes a CPU which receives the code data sent from the PS/WS 7A through the dual port memory 803, by means of a CPU bus 857. After the code data is once stored in a memory 805, such the data is sequentially expanded into the image data, and then transferred to a memory A 806 or a memory B 807 through a memory controller 808.

Each of the memories 806 and 807 has the capacity of 1 Mbyte, and can cope with (or store) the data corresponding to the A4 size at resolution 300 dpi. The memories 806 and 807 are connected to the memory controller 808 by means of respective data bus lines 858 and 859.

The memory controller 808 controls the memory A 806 and the memory B 807 on the basis of the instruction from the CPU 809. For example, in order to cope with the data corresponding to the A3 size at the resolution 300 dpi, it is controlled that the memories 806 and 807 are cascade-connected to each other to expand the image data.

Numeral 804 denotes a rotation circuit which rotates the image data and then transfers the rotated image to the memory A 806 or the memory B 807 if it is necessary to rotate the character, the drawing and the like when the image data is expanded.

If the image data expanding in the memory A 806 or the memory B 807 terminates, the data bus line 858 of the memory A 806 or the data bus line 859 of the memory B 807 is connected to an output line 851 of the memory controller 808 under the control of the CPU 809.

Numeral 802 denotes a timing generation circuit which outputs the timing signal to the memory controller 808 through a signal line 856, according to the signal inputted from the core unit 10 through the connector 800 and a signal line 852. Such the timing signal is used to read the image information from the memory A 806 or the memory B 807 and transfer the read information to the memory controller 808.

The connector 800 transfers the output image signal of the memory controller 808 transferred through the signal line 851, to the core unit 10.

The memory 805 contains the program memory storing the programs to be executed by the CPU 809.

Hereinafter, the operation of each unit will be explained.

Initially, the data from the computer I/F unit 7 is judged in the core unit 10. That is, if it is judged that the data concerns the formatter unit 8, the CPU 1003 of the core unit 10 transfers such the data from the computer to the dual port memory 803 through the connector 1008 of the core unit 10 and the connector 800 of the formatter unit 8.

The CPU 809 of the formatter unit 8 receives the code data sent from the computer through the dual port memory 803. After the code data is once stored in the memory 805, such the data is expanded into the image data by the CPU 809. The obtained image data is then transferred to the memory A 806 or the memory B 807 through the memory controller 808.

When the code data is developed into the image data, if it is necessary to rotate the character, the drawing and the like, the image data is rotated by the rotation circuit 804 and then transferred to the memory A 806 or the memory B 807. If the image data expanding in the memory A 806 or the memory B 807 terminates, the data bus line 858 of the memory A 806 or the data bus line 859 of the memory B 807 is connected to the output line 851 of the memory controller 808 by the CPU 809.

Subsequently, the CPU 809 communicates with the CPU 1003 of the core unit 10 through the dual port memory 803 to set the mode to output the image information from the memory A 806 or the memory B 807. The CPU 1003 of the core unit 10 sets the print output mode to the CPU 122 of the reader unit 1 by using the communication function contained in the CPU 122 through the communication IC 1002 of the core unit 10.

Hereinafter, the operation of each unit in the print output mode will be explained.

Initially, if the print output mode is set, the CPU 1003 of the core unit 10 starts up the timing generation circuit 802 of the formatter unit 8 through the connectors 1008 and 800. Thus, the timing generation circuit 802 generates the timing signal to be used to read the image information from the memory A 806 or the memory B 807, according to the signal from the core unit 10.

The image information from the memory A 806 or the memory B 807 is inputted to the memory controller 808. The output image information from the memory controller 808 is then transferred to the core unit 10 through the signal line 851 and the connector 800. Since the output operation from the core unit 10 to the printer unit 2 is substantially the same as that in the explanation of the core unit 10, the explanation thereof is omitted.

Subsequently, the procedure to receive the information from the formatter unit 8 and then form the image on the output sheet will be explained.

The image information from the formatter unit 8 is sent to the signal line 1064 through the connector 1008, as the multivalue signal having the two kinds of values ("00H" and "FFH"). The signal of the signal line 1064 is inputted to the selectors 1014 and 1017, and the CPU 1003 controls these selectors 1014 and 1017. Since the following operation is substantially the same as that in case of the above-described facsimile unit 4, the explanation thereof is omitted.

Subsequently, the operation in the case where the document in which the plural different-size sheets mixedly exist and to which the double-face print has been designated is printed by using the formatter unit 8 will be explained. In the explanation, it pays attention especially to the image drawing directions.

The external PC/WS 7A and the reader unit 1 (i.e., operation unit 124) can select and designate "short edge binding double-face mode" or "long edge binding double-face mode" as the double-face mode to the document composed of the plural pages intended to be subjected to the double-face outputting by the image formation apparatus. Furthermore, the PC/WS 7A and the operation unit 124 can select the sheet size (e.g., A3, A4, B4, B5) and the image drawing direction (portrait drawing, landscape drawing) for each page. Furthermore, it is possible to designate the stapling process in the double-face mode such that the stapling process is performed to the output sheets by the stapler 221.

In this case, the data from the PC/WS 7A necessary for the image formation of the plural pages is sent to the formatter unit 8 through the computer I/F unit 7 and the core unit 10. Furthermore, the data necessary for the plural-page image formation which is composed of the image data read by the CCD 109 of the reader unit 1 and the various data designated by the operation unit 124 is sent to the formatter unit 8 from the reader unit 1 through the core unit 10.

Figure 7:
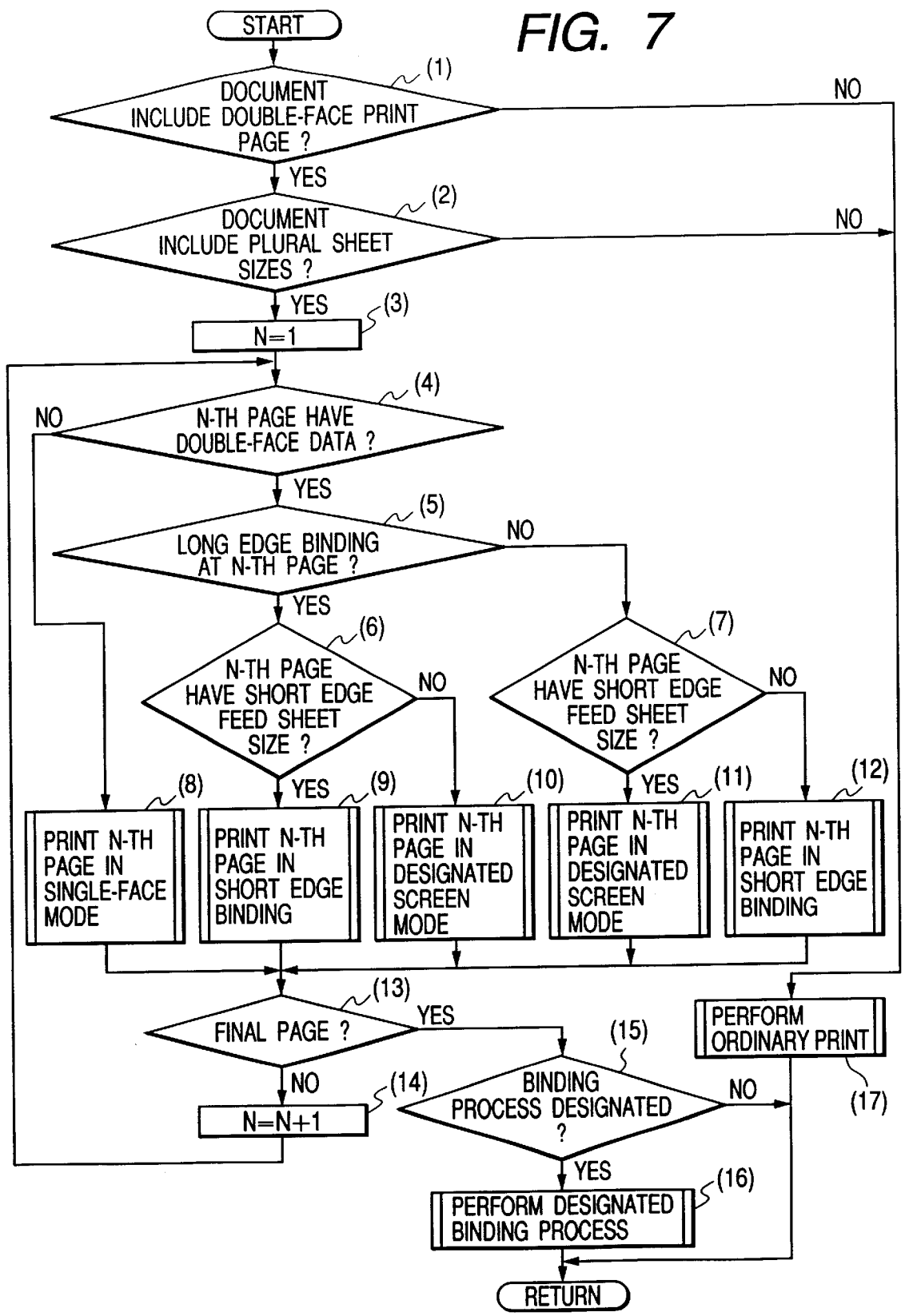
FIG. 7 is a flow chart for explaining a first print control procedure of the image formation apparatus according to the present invention.

Subsequently, in the formatter unit 8, when the data of one job is received in the above-described procedure, such data is once stored in the memory 805, and the print operation shown in FIG. 7 is performed.

Hereinafter, the first print control operation of the image formation apparatus according to the present invention will be explained with reference to the flow chart shown in FIG. 7.

FIG. 7 is the flow chart for explaining the first print control procedure of the image formation apparatus according to the present invention. This procedure is executed based on the programs stored in the memory 805 at the time when the CPU 809 of the formatter unit 8 receives the data externally and stores it in the memory 805. In the drawing, it should be noted that numeral (1) to (17) correspond to the respective steps.

If the data of one job is stored in the memory 805 of the formatter unit 8, it is judged whether or not the document to be printed in this job includes the double-face print page (1). If judged that the document does not include the double-face print page, the ordinary print is performed (17), and the process terminates. Then, the flow returns to the state waiting for next data.

On the other hand, if judged in the step (1) that the document to be printed in this job includes the double-face print page, it is further judged whether or not the document includes the plural sheet sizes (2). If judged that the document does not include the plural sheet sizes, then the ordinary print is performed (17), and the process terminates. Then, the flow returns to the state waiting for next data.

On the other hand, if judged in the step (2) that the document includes the plural sheet sizes, "1" is substituted for a variable N representing the current page (3). It is then judged whether or not the N-th page corresponds to the double-face data (4). If judged that the N-th page does not correspond to the double-face data but corresponds to the single-face data, the N-th page is printed in the designated single-face mode (8), and the flow advances to the step (13).

On the other hand, if judged in the step (4) that the N-th page corresponds to the double-face data, it is further judged whether or not the designated double-face mode corresponds to the long edge binding (i.e., long edge binding double-face mode) (5). If judged that the double-face mode corresponds to the long edge binding, it is further judged whether or not N-th page has the short edge feed sheet size (6).

Figure 11A:
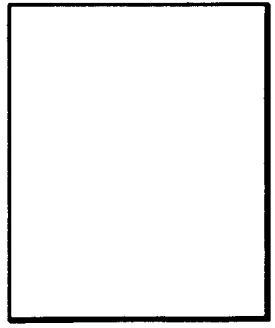
FIGS. 11A and 11B are diagrams each showing the relation between a sheet direction and a sheet feed direction.
Figure 11B:
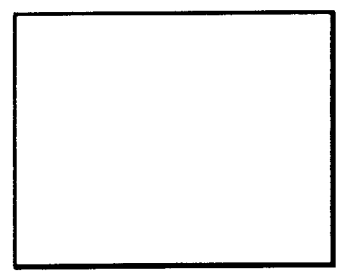
Figure 12A:
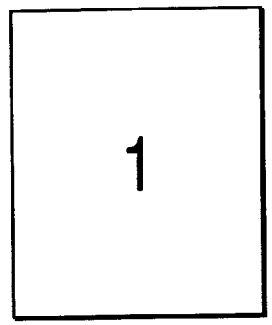
FIGS. 12A and 12B are diagrams showing output results of first to fourth pages of an A4-size long edge feed sheets in portrait drawing.
Figure 12B:
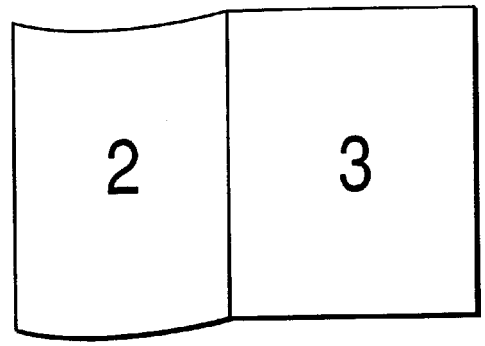
Figure 13A:
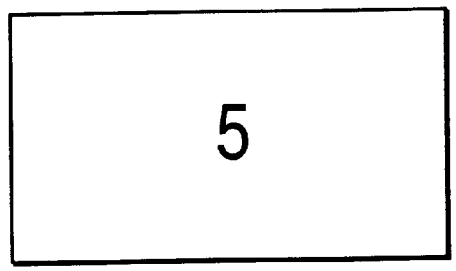
FIGS. 13A and 13B are diagrams showing output results of fifth to eighth pages of an A3-size short edge feed sheets in landscape drawing.
Figure 13B:
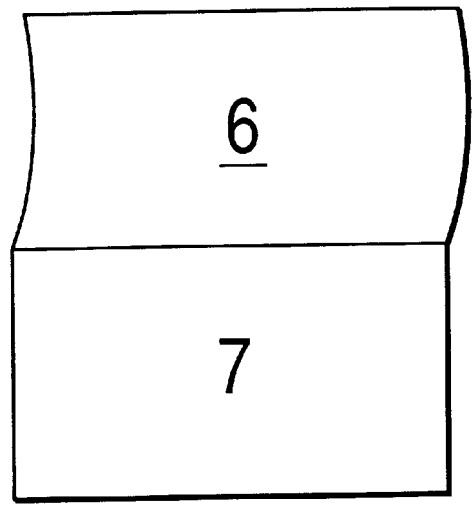
Figure 14A:
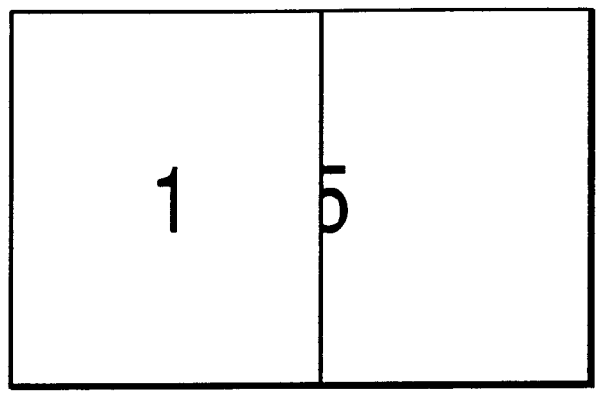
FIGS. 14A and 14B are diagrams showing a state that the output results of the first to fourth pages of the A4-size long edge feed sheets in the portrait drawing of FIGS. 12A and 12B and the output results of the fifth to eight pages of the A3-size short edge feed sheets in the landscape drawing of FIGS. 13A and 13B are bound into a sheaf.
Figure 14B:
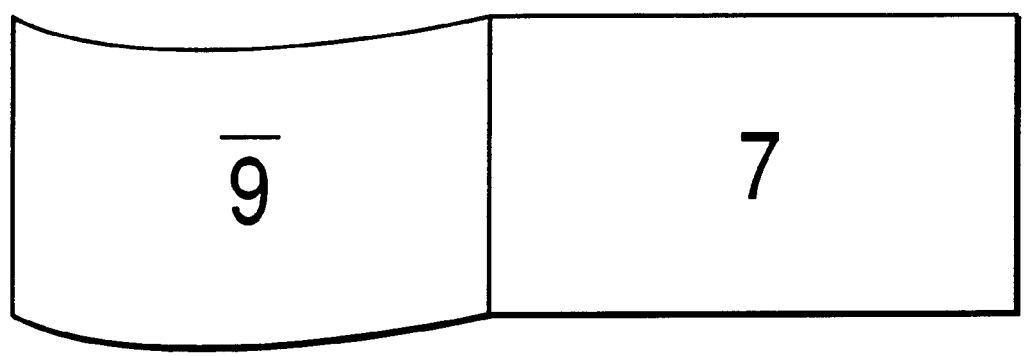

Here, for example, the short edge feed sheet size is an A3 size, a B4 size or the like, and the long edge feed sheet size is an A4 size, a B5 size or the like. As explained above, the short edge feed corresponds to the mode to feed the short edge of the sheet as the leading edge, and the long edge feed corresponds to the mode to feed the long edge of the sheet as the leading edge (FIGS. 11A and 11B).

If judged in the step (6) that the N-th page has the short edge feed sheet size, the N-th page is printed in the short edge binding (i.e., short edge binding double-face mode) (9), and the flow advances to the step (13).

On the other hand, if judged in the step (6) that the N-th page does not have the short edge feed sheet size but has the long edge feed sheet size, the N-th page is printed in the designated print mode (10), and the flow advances to the step (13).

On the other hand, if judged in the step (5) that the designated double-face mode does not correspond to the long edge binding (i.e., long edge binding double-face mode) but corresponds to the short edge binding (i.e., short edge binding double-face mode), it is further judged whether or not the N-th page has the short edge feed sheet size (7). If judged that the N-th page has the short edge feed sheet size, the N-th. page is printed in the designated double-face mode (11), and the flow advances to the step (13).

On the other hand, if judged in the step (7) that the N-th page does not have the short edge feed sheet size but has the long edge feed sheet size, the N-th page is printed in the long edge binding (i.e., long edge binding double-face mode) (12), and the flow advances to the step (13).

Subsequently, after the print process of the N-th page is performed, it is further judged whether or not the N-th page is the final page (13). If judged that the N-th page is not the final page, the variable N representing the current page is increased by "1", and the flow returns to the step (4).

On the other hand, if judged in the step (13) that the N-th page is the final page, it is further judged whether or not the binding process (i.e., stapling process) is being designated (15). If judged that the binding process is being designated, the designated binding process is performed (16), and the process terminates. Then, the flow returns to the state waiting for next data.

On the other hand, if judged in the step (15) that the binding process is not designated, the process directly terminates, and the flow returns to the state waiting for next data.

By the above processes, even if the identical double-face mode is designated and the plural different-size sheets are printed in this mode, it is possible to perform the print in which any conflict in the binding directions does not occur.

Figure 8A:
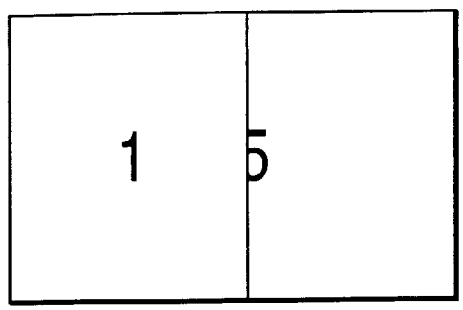
FIGS. 8A and 8B are diagrams showing a print result obtained in the image print control procedure shown in FIG. 7.
Figure 8B:
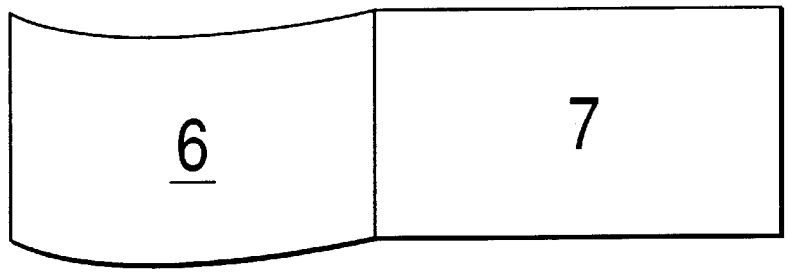
Figure 9A:
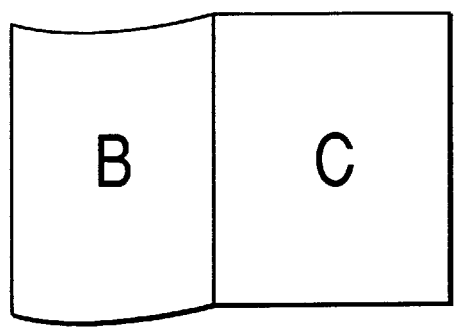
FIGS. 9A and 9B are diagrams each showing the relation between a double-face mode and an image formation direction.
Figure 9B:
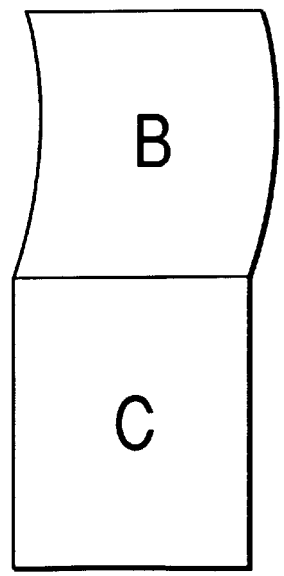
Figure 10A:
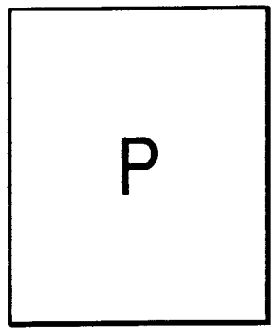
FIGS. 10A and 10B are diagrams each showing the relation between a sheet (or paper) direction and an image direction on a sheet.
Figure 10B:
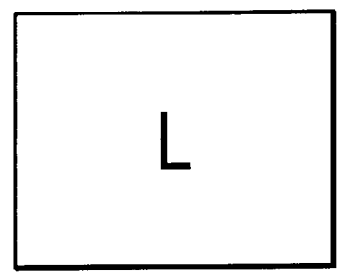

FIGS. 8A and 8B are diagrams showing the print result obtained in the image print control procedure shown in FIG. 7.

The illustrated document is the document which is composed of the eight pages. In this procedure, the first to fourth pages are designated to correspond to the A4 portrait data, and the fifth to eighth pages are designated to correspond to the A3 landscape data. Then, the print is performed to obtain the output result.

Concretely, FIG. 8A shows the state that the output results are bound into the sheaf, and FIG. 8B shows the state that the sixth and seventh pages of the sheaf shown in FIG. 8A are spread. As shown in the drawings, even if the binding function is executed in the state that the A4 size and the A3 size mixedly exist in one document, it is possible to perform the optimum double-face print in which any conflict in the print directions does not occur.

As above, it is possible to perform the optimum double-face print even in the case where the plural sheet sizes mixedly exist. Concretely, even if the double-face drawing is designated to the entire document in either the short edge binding or the long edge binding, the designated drawing directions on the two faces are ignored according to the sheet size, and the drawing is then performed. Thus, it is possible to provide the optimum binding function.

It is obviously understood that the object of the present invention can be achieved also in a case where a storage medium storing the rein program codes of software to realize the functions of the above embodiment is supplied to a system or an apparatus, and thus a computer (or CPU, MPU) in the system or apparatus reads and executes the program codes stored in the medium.

In this case, the program codes themselves read from the storage medium realize the novelty functions of the present invention. Therefore, the storage medium storing these program codes constitutes the present invention.

As the storage medium from which the program codes are supplied, e.g., a floppy disk, a hard disk, an optical disk, a magneto-optical disk, a CD-ROM, a CD-R, a magnetic tape, a non-volatile memory card, a ROM, an EEPROM and the like can be used.

Furthermore, it can be obviously understood that the present invention includes not only a case where the functions of the above embodiment are realized by executing the program codes read by the computer, but also a case where an OS (operating system) or the like running on the computer performs a part or all of the actual processes on the basis of instructions of the program codes and thus the functions of the above embodiment are realized by such the processes.

Furthermore, it can be obviously understood that the present invention also includes a case where, after the program codes read from the storage medium are written into a function expansion board inserted in the computer or a memory in a function expansion unit connected to the computer, a CPU or the like provided in the function expansion board or the function expansion unit performs a part or all of the actual processes on the basis of the instructions of the program codes, and thus the functions of the above embodiment are realized by such the processes.

Furthermore, the present invention can be applied to a system consisting of plural devices or to an apparatus comprising a single device. Furthermore, it is obviously understood that the present invention is applicable also to a case where the object of the present invention is achieved by supplying a program to a system or an apparatus. In this case, if the storage medium storing the programs represented by the software to achieve the present invention is read in the system or the apparatus, it become possible that such the system or the apparatus derives the effect of the present invention.

Furthermore, if the program represented by the software to achieve the present invention is downloaded from a data base on a network according to a communication program and then read into the system or the apparatus, it becomes possible that such the system or the apparatus derives the effect of the present invention.

In the case where it is instructed to perform the double-face print and the binding margin print to the job in which the small-size (e.g., A4) page mixes with the large-size (e.g., A3) page, the process shown in the flow chart of FIG. 7 means that the apparatus does not obey the rotation designation to the specific page among the rotation designations to every pages outputted from the printer driver.

FIGS. 15A, 15B, 15C, 16A, 16B, 16C, 16D, 17A, 17B, 17C, 17D, 18A, 18B, 18C, 18D, 19A, 19B, 19C and 19D are views for explaining the processes to be performed in the case where either the long edge binding double-face mode or the short edge binding double-face mode is set.

Figure 15A:
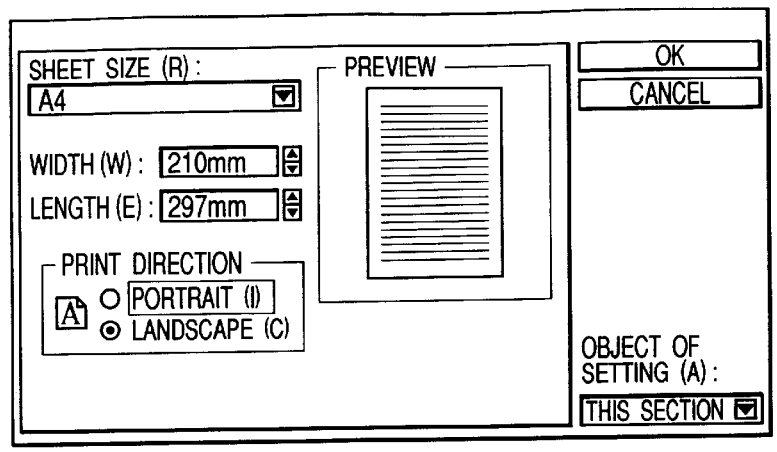
FIGS. 15A, 15B and 15C are views showing an example of a setting screen of a PC/WS.
Figure 15B:
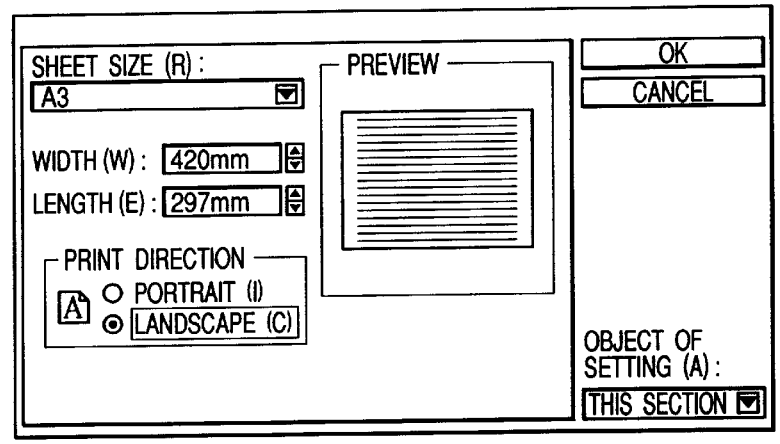

For example, it is assumed that a user makes the document of four pages by using a word processor software in the PC/WS 7A having the printer driver. Furthermore, it is assumed that the user sets the original sizes and directions of the first page (referred as P1 hereinafter) and the second page (referred as P2 hereinafter) of the document as "A4 portrait" on the page setting screen based on the word processor software (FIG. 15A) and sets the original sizes and directions of the third page (referred as P3 hereinafter) and fourth page (referred as P4 hereinafter) of the document as "A3 landscape" on the setting screen (FIG. 15B).

Figure 15C:
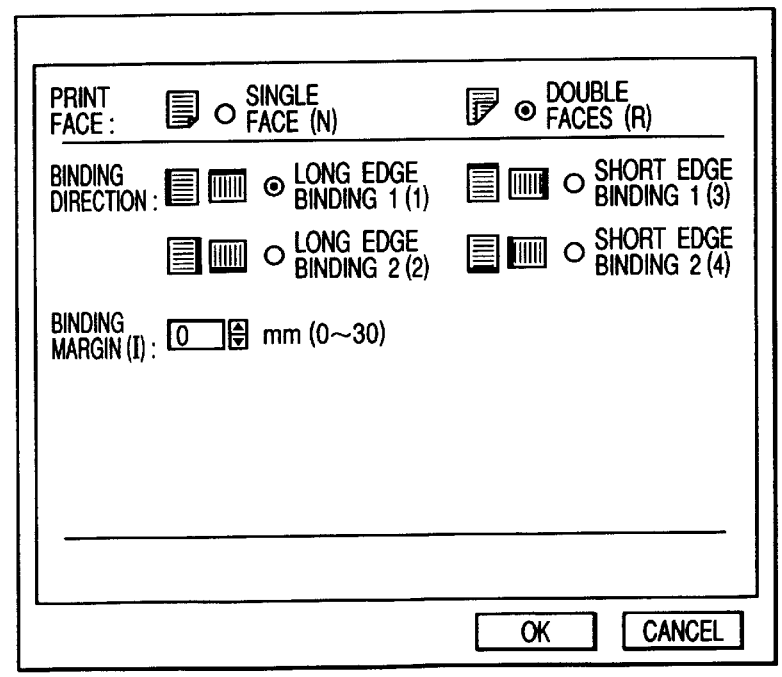

Subsequently, it is assumed that, on the printer driver setting screen of the PC/WS 7A, the user sets the double-face print and the long edge binding (i.e., long edge binding double-face mode) to the four-page document in which the two A4 portrait pages and the two A3 landscape pages mixedly exist (FIG. 15C).

As above, in one job, it is possible to set the sheet size for each page (P1, P2, P3 and P4) on the setting screen of the word processor software, while it is possible to set the long edge binding double-face mode or the short edge binding double-face mode for each job on the printer driver setting screen. That is, it is possible for the user to independently set the sheet size and the print mode.

In case of forming the document on the recording sheet, the image of the P1 is formed on the front face (first face)

of the first recording sheet, the image of the P2 is formed on the back face (second face) of the first sheet, the image of the P3 is formed on the front face (first face) of the second sheet, and the image of the P4 is formed on the back face (second face) of the second sheet. Furthermore, in order to faithfully reproduce the data formed based on the word processor software by the user, the optimum output recording sheet size is automatically selected on the basis of the original size unless the output sheet size is designated by the user. In this case, the size of the first recording sheet (referred as sheet A hereinafter) is set as "A4" being identical with the original size of the P1 and P2, and the size of the second recording sheet (referred as sheet B hereinafter) is set as "A3" being identical with the original size of the P3 and P4. Furthermore, the sheet A is set as the long edge feed sheet which is fed with its long edge in the lead, and the sheet B is set as the short edge feed sheet which is fed with its short edge in the lead.

If the operation mode set by the user is the long edge binding double-face mode, the printer driver sets the long edge side of the output sheet as the binding direction (or side), and outputs the instruction together with the image data to the printer side to form the images on the two faces of the sheet on the basis of the set binding direction. Hereinafter, the instruction by the printer driver will be explained with reference to FIG. 16A. FIG. 16A shows the document formed by the PC/WS 7A with the word processor software. Namely, FIG. 16A shows the four-page document in which the two A4 pages and the two A3 pages mixedly exist.

In case of considering the first face as the standard, the long edge of the first recording sheet A is at the left side (left end portion) of the sheet A. Therefore, the image rotation of the P1 is designated as 0° such that the image of the P2 is formed in the normal standing state when the user turns over the first face of the sheet A around the axis being the left end portion (i.e., binding edge of sheet A) and looks at the second face thereof. Similarly, the image rotation of the P2 is designated as 0°. Such the image rotation designations are then outputted to the printer side as the instruction from the printer driver.

On the other hand, the long edge of the second recording sheet B is at the upper side (upper end portion) of the sheet B, in case of considering the first face. Therefore, the image rotation of the P3 is designated as 0° such that the image of the P4 is formed in the normal standing state when the user turns over the first face of the sheet B around the axis being the upper end portion and looks at the second face thereof. Similarly, the image rotation of the P4 is designated as 180°. Such the image rotation designations are then outputted to the printer side as the instruction from the printer driver. As above, the image rotation designation is set for each page (P1, P2, P3 and P4 in this case).

Subsequently, a case where the printer side performs the image rotation process and then the image formation process according to the instruction from the printer driver will be explained with reference to FIG. 16C. Furthermore, a case where the printer side performs the image formation process without obeying the instruction from the driver concerning the image rotation designation to the predetermined (or specific) page will be explained with reference to FIG. 16D. FIGS. 16C and 16D respectively shows the states of the sheaves of sheets which are obtained when the image is formed on each face of the recording sheets A and B and these sheets are then bound into one sheaf by the user.

In the case where the plural different-size sheets are bound into one sheaf, for example, it is thought that the respective sheet directions are arranged such that the sheet lengths of the respective binding directions (or edges) are coincident. That is, in this case, since the long edge length of the sheet A is coincident with the short edge length of the sheet B, the sheet directions are arranged such that the long edge of the sheet A and the short edge of the sheet B overlap each other (FIGS. 16C and 16D). It is thought that such the arrangement is applicable not only to the case where the user himself handles the sheets but also to the case where the printer side automatically handles the sheets. For example, it is thought that the above arrangement is applicable to the case where the printer side arranges the sheet directions such that the long edge of the sheet A and the short edge of the sheet B overlap each other and then outputs the arranged sheets. For this reason, in case of considering the first face as the standard, the binding direction of the sheaf of sheets is at the left side (left edge portion).

Therefore, in the case where the sheets are bound into one sheaf, the binding direction (or edge) of the sheet A is the long edge direction, and this direction is identical with the binding direction set by the printer driver. However, the binding direction (or edge) of the sheet B is the short edge direction, and this direction is different from the binding direction set by the printer driver.

On the other hand, the image rotation designation outputted from the printer driver to the printer unit is the rotation designation based on the binding direction set by the driver. For example, as shown in FIG. 16B, since the set binding direction (or edge) is the long edge direction, the image rotation designation is outputted to the printer unit for each page on the basis of the long edge direction.

As above, although the recording sheet B is arranged in the direction different from the binding direction set at the printer driver side, if the image rotation and formation processes are performed for each page according to the designation by the driver, the image direction of the P4 on the second face of the sheet B is opposite to the image direction on the other faces by 180° as shown in FIG. 16C. Therefore, when the user turns over the recording sheets one by one around the axis being the left edge of the sheaf and then looks at the image of the P4 on the fourth page of the sheaf, it is difficult for him to clearly recognize this image because the direction of only this image is upside down.

According to the embodiment, to prevent such inconvenience, the CPU 809 controls the printer side such that, in the image rotation designation for each page outputted from the printer driver, the printer side does not obey the rotation designation to the predetermined or specific page but obeys the rotation designation to the other pages.

For example, in this case, although the instruction to rotate the image by 180° so that the P4 to be formed on the second face of the recording sheet B is outputted from the printer driver to the printer side, the printer side does not obey the image rotation designation four this (i.e., fourth) page. Thus, the printer side is controlled to perform the image formation of the P4 of the second face of the sheet B. without performing any image rotation process to the image of the P4. On the other hand, the printer side is controlled to obey the image rotation designation to the images of the P1, P2 and P3, whereby the printer side performs the image rotation process according to the rotation designation to each of the P1, P2 and P3.

That is, the CPU 809 expects that the directions of the sheets A and B are arranged such that the long edge of the sheet A and the short edge of the sheet B overlap each other. Thus, as the process to arrange or align the binding directions of the sheets (referred as binding direction arranging process), the CPU 809 performs the image rotation process that the rotation designation data concerning the predetermined page outputted by the printer driver is ignored, the new rotation designation data is reset at the printer side, and the image is actually rotated based on the new rotation designation data. At this time, the CPU 809 obtains the data concerning the original size of the document, the image direction, the recording sheet size, the lengths of the long and short edges of the sheet on which the image is to be formed, refers to the table previously stored in the memory, and thus judges the binding direction of the sheaf of sheets at the time when the sheets are bound into the sheaf (i.e., left end portion in this case). Furthermore, the CPU 809 checks the binding direction of each sheet. For example, in this case, the CPU 809 judges that the binding direction of the sheet A is the long edge direction which is identical with the direction set by the driver, and that the binding direction of the sheet B is the short edge direction which is different from the direction set by the driver. On the basis of the judged result, the CPU 809 sets the corresponding rotation designation data for each image data. For example, in this case, the image rotation designation of the P4 which was set as 180° at the driver side is reset as 0° at the printer side.

Therefore, as shown in FIG. 16D, since the image direction of the P4 formed on the second face of the recording sheet B is identical with the image direction on the other faces, it is possible to prevent the above inconvenience that, when the user turns over the recording sheets one by one around the axis being the left edge of the sheaf and then looks at the image of the P4 on the fourth page, it is difficult for him to clearly recognize this image because the direction of only this image is upside down.

Subsequently, the process to be performed when the document composed of four pages, i.e., the two A4 landscape pages (P1 and P2) and the two A3 portrait pages (P3 and P4), is formed by the user with the word processor software running in the PC/WS 7A (FIG. 17A) and the long edge binding double-face mode is set to this document on the printer driver setting screen will be explained.

Like the above, the image of the P1 is formed on the first face of the first recording sheet A, the image of the P2 is formed on the second face thereof, the image of the P3 is formed on the first face of the second sheet B, and the image of the P4 is formed on the second face thereof. Furthermore, as to the output sheet size (i.e., recording sheet size), in order to faithfully reproduce the data formed by the user with the word processor software, the optimum sheet size is automatically selected on the basis of the original size unless the output sheet size is designated by the user. In this case, the size of the first recording sheet A is set as "A4" being identical with the original size of the P1 and P2, and the size of the second recording sheet B is set as "A3" being identical with the original size of the P3 and P4. However, in the case shown in FIGS. 17A to 17D, the sheet A is set as the short edge feed sheet and the sheet B is set as the long edge feed sheet. If the printer driver is set by the user, the image rotation designation to each page shown in FIG. 17B is outputted to the printer unit as the instruction by the printer driver.

At the printer side, if the image rotation process is performed for each page according to the instruction from the driver and the image formation is performed based on the rotation result, the recording sheets A and B are bound into one sheaf by the user in such the state as shown in FIG. 17C. However, in this case, the image direction of the P4 on the second face of the sheet B is opposite by 180° to the image direction on the other faces as shown in FIG. 17C.

On the other hand, according to the embodiment, the CPU 809 controls the printer side such that, in the image rotation designation for each page outputted from the printer driver, the printer side does not obey the rotation designation to the predetermined or specific page but obeys the rotation designation to the other pages. For example, in this case, although the rotation designation to rotate by 0° (i.e., not to rotate) the image of the P4 to be formed on the second face of the recording sheet B is outputted from the printer driver to the printer side, the printer side does not obey such the image rotation designation to this (i.e., fourth) page and performs the process to rotate the image of the P4 by 180°. Then, the image of the P4 subjected to the rotation process is actually formed on the second face of the sheet B. As above, according to the embodiment, as to the predetermined page (P4 in this case), the printer side is controlled by the CPU 809 not to perform the image rotation process according to the rotation designation from the driver but to uniquely perform the image rotation process irrelative to the rotation designation from the driver. On the other hand, the printer side is controlled to obey the image rotation designation to the images of the P1, P2 and P3, whereby the printer side performs the image rotation process according to the rotation designation to each of the P1, P2 and P3.

That is, the CPU 809 expects that the directions of the sheets A and B are arranged such that the long edge of the sheet A and the short edge of the sheet B overlap each other. Thus, as the binding direction arranging process, the CPU 809 performs the image rotation process that the rotation designation data concerning the predetermined page outputted by the printer driver is ignored, the new rotation designation data is reset at the printer side, and the image is actually rotated based on the new rotation designation data. For example, in this case, the image rotation designation of the P4 which was set as 0° at the driver side is reset as 180° at the printer side, the process to rotate the image of the P4 by 180° is performed, and the processed image of the P4 is formed on the second face of the sheet B.

Therefore, as shown in FIG. 17D, since the direction of the image of the P4 formed on the second face of the sheet B is identical with the direction of the images formed on the other faces, it is possible to prevent the above inconvenience that, when the user turns over the recording sheets one by one around the axis being the upper edge of the sheaf and then looks at the image of the P4 on the fourth page, it is difficult for him to clearly recognize this image because the direction of only this image is upside down.

Subsequently, the process to be performed when the document composed of four pages, i.e., the two A4 portrait pages (P1 and P2) and the two A3 landscape pages (P3 and P4), is formed by the user with the word processor software running in the PC/WS 7A (FIG. 18A) and the short edge binding double-face mode (i.e., double-face print and short edge binding) is set to this document on the printer driver setting screen will be explained with reference to FIGS. 18A to 18D.

Like the above, the image of the P1 is formed on the first face of the first recording sheet A, the image of the P2 is formed on the second face thereof, the image of the P3 is formed on the first face of the second sheet B, and the image of the P4 is formed on the second face thereof. Furthermore, as to the output sheet size (i.e., recording sheet size), in order to faithfully reproduce the data formed by the user with the word processor software, the optimum sheet size is automatically selected on the basis of the original size unless the output sheet size is designated by the user. In this case; the size of the first recording sheet A is set as "A4" being identical with the original size of the P1 and P2, and the size of the second recording sheet B is set as "A3" being identical with the original size of the P3 and P4. However, in the case shown in FIGS. 18A to 18D, the sheet A is set as the long edge feed sheet and the sheet B is set as the short edge feed sheet.

If the printer driver is set by the user, the image rotation designation to each page shown in FIG. 18B is outputted to the printer unit as the instruction by the printer driver.

At the printer side, if the image rotation process is performed for each page according to the instruction from the driver and the image formation is performed based on the rotation result, the recording sheets A and B are bound into one sheaf by the user in such the state as shown in FIG. 18C.

As described above, in the case where the plural different-size sheets are bound into one sheaf, for example, it is thought that the respective sheet directions are arranged such that the sheet lengths of the respective binding directions (or edges) are coincident. That is, in this case, since the long edge length of the sheet A is coincident with the short edge length of the sheet B, the sheet directions are arranged such that the long edge of the sheet A and the short edge of the sheet B overlap each other (FIGS. 18C and 18D). It is thought that such the arrangement is applicable not only to the case where the user himself handles the sheets but also to the case where the printer side automatically handles the sheets. For this reason, in case of considering the first face as the standard, the binding direction of the sheaf of sheets is at the left side (left edge portion).

Therefore, in FIGS. 18A to 18D, in the case where the sheets are bound into one sheaf, the binding direction (or edge) of the sheet B is the short edge direction, and this direction is identical with the binding direction set by the printer driver. However, the binding direction (or edge) of the sheet A is the long edge direction, and this direction is different from the binding direction previously set by the printer driver.

As above, although the recording sheet A is outputted in the binding direction different from the binding direction set at the printer driver side, if the image rotation and formation processes are performed for each page according to the designation by the driver, the image direction of the P2 on the second face of the sheet A is opposite to the image direction on the other faces by 180° as shown in FIG. 18C.

On the other hand, according to the embodiment, the CPU 809 controls the printer side such that, in the image rotation designation for each page outputted from the printer driver, the printer side does not obey the rotation designation to the predetermined or specific page but obeys the rotation designation to the other pages. For example, in this case, although the instruction to rotate by 180° the image of the P2 to be formed on the second face of the recording sheet A is outputted from the printer driver to the printer side (FIG. 18B), the printer side does not obey such the image rotation designation to this page. Thus, the printer side is controlled to form the image of the P2 to the second face of the sheet A as it is without performing any image rotation process to the image of the P2. On the other hand, the printer side is controlled to obey the image rotation designation to the images of the P1, P3 and P4, whereby the printer side performs the image rotation process according to the rotation designation to each of the P1, P3 and P4.

Therefore, as shown in FIG. 18D, since the image direction of P2 formed on the second face of the recording sheet A is identical with the image direction on the other faces, it is possible to prevent the inconvenience that, when the user turns over the recording sheets one by one around the axis of the left edge of the sheaf and then looks at the image of the P2 on the second page, it will be difficult for the user to clearly recognize this image because the direction of this image only is upside down.

Subsequently, the process to be performed when the document composed of four pages, i.e., the two A4 landscape pages (P1 and P2) and the two A3 portrait pages (P3 and P4), is formed by the user with the word processor software running in the PC/WS 7A (FIG. 19A) and the short edge binding double-face mode (i.e., double-face print and short edge bonding) is set to this document on the printer driver setting screen will be explained with reference to FIGS. 19A to 19D.

Like the above, the image of the P1 is formed on the first face of the first recording sheet A, the image of the P2 is formed on the second face thereof, the image of the P3 is formed on the first face of the second sheet B, and the image of the P4 is formed on the second face thereof. Furthermore, as to the output sheet size (i.e., recording sheet size), in order to faithfully reproduce the data formed by the user with the word processor software, the optimum sheet size is automatically selected on the basis of the original size unless the output sheet size is designated by the user. In this case, the size of the first recording sheet A is set as "A4" being identical with the original size of the P1 and P2, and the size of the second recording sheet B is set as "A3" being identical with the original size of the P3 and P4. However, in FIGS. 19A to 19D, the sheet A is set as the short edge feed sheet and the sheet B is set as the long edge feed sheet.

If the printer driver is set by the user, the image rotation designation to each page shown in FIG. 19B is outputted to the printer unit as the instruction by the printer driver.

At the printer side, if the image rotation process is performed for each page according to the instruction from the driver and the image formation is performed based on the rotation result, the recording sheets A and B are bound into one sheaf by the user in such the state as shown in FIG. 19C.

As described above, in the case where the plural different-size sheets are bound into one sheaf, for example, it is thought that the respective sheet directions are arranged such that the sheet lengths of the respective binding directions (or edges) are coincident. That is, in this case, since the long edge length of the sheet A is coincident with the short edge length of the sheet B, the sheet directions are arranged such that the long edge of the sheet A and the short edge of the sheet B overlap each other (FIGS. 19C and 19D). It is thought that such the arrangement is applicable not only to the case where the user himself handles the sheets but also to the case where the printer side automatically handles the sheets. For this reason, in case of considering the first face as the standard, the binding direction of the sheaf of sheets is at the upper side (upper edge portion).

Therefore, in FIGS. 19A to 19D, in the case where the sheets are bound into one sheaf, the binding direction (or edge) of the sheet B is the short edge direction, and this direction is identical with the binding direction set by the printer driver. However, the binding direction (or edge) of the sheet A is the long edge direction, and this direction is different from the binding direction set by the printer driver.

As above, although the recording sheet A is outputted in the binding direction different from the binding direction set at the printer driver side, if the image rotation and formation processes are performed for each page according to the designation by the driver, the image direction of the P2 on the second face of the sheet A is opposite to the image direction on the other faces by 180° as shown in FIG. 19C.

On the other hand, according to the present embodiment, the CPU 809 controls the printer side such that, in the image rotation designation for each page outputted from the printer driver, the printer side does not obey the rotation designation to the predetermined or specific page but obeys the rotation designation to the other pages. For example, in this case, although the instruction to rotate by 0° (i.e., not to rotate) the image of the P2 to be formed on the second face of the recording sheet A is outputted from the printer driver to the printer unit (FIG. 19B), the printer unit does not obey such the image rotation designation to this page but performs the process to rotate the image of the P2 by 180°. The image of the P2 subjected to the rotation process is then formed on the second face of the recording sheet A. As above, according to the embodiment, as to the predetermined page (P2 in this case), the printer side is controlled by the CPU 809 not to perform the image rotation process according to the rotation designation from the driver but to uniquely perform the image rotation process. On the other hand, the printer side is controlled to obey the image rotation designation to the images of the P1, P3 and P4, whereby the printer side performs the image rotation process according to the rotation designation to each of the P1, P3 and P4.

Therefore, as shown in FIG. 19D, since the image direction of the P2 formed on the second face of the recording sheet A is identical with the image direction on the other faces, it is possible to prevent the inconvenience that, when the user turns over the recording sheets one by one around the axis being the upper edge of the sheaf and then looks at the image of the P2 on the second page, it is difficult for him to clearly recognize this image because the direction of only this image is upside down.

As explained above, as to the job in which the small-size page mixes with the large-size page, if either the long edge binding double-face mode or the short edge binding double-face mode is set, the printer unit is controlled not to obey the rotation designation. to the predetermined page among the plural rotation designations to the respective pages outputted from the printer driver. Therefore, even if the plural sheet sizes mixedly exist in one document, it is possible to obtain the optimum double-face print output result in which the binding directions are satisfactorily arranged or adjusted.

As explained in FIGS. 15A to 15C, 16A to 16D, 17A to 17D, 18A to 18D and 19A to 19D, although the binding direction arranging process is performed at the printer side in the embodiment, the present invention is not limited to this. That is, such the process may be performed at the printer driver side.

For example, if the long edge binding is set by the user on the printer driver setting screen (FIGS. 15A to 15C), the driver designates that the large-size page is rotated according to the binding direction of the small-size page. This process will be explained with reference to FIGS. 16A to 16D.

If the driver does not perform the binding direction arranging process, as described above, the rotation designation of the image of the P4 formed on the second face of the sheet B is outputted from the driver to the printer side to perform the process to rotate the image of the P4 by 180° (FIG. 16B). In this case, if the printer side does not perform the binding direction arranging process, the image direction of the P4 on the second face of the sheet B is opposite to the image direction on the other faces by 1800 as shown in FIG. 16C.

On the contrary, if the driver performs the binding direction arranging process, the rotation designation of the image of the P4 formed on the second face of the A3-size sheet B (i.e., rotation designation of large-size page) is set to be identical with the rotation designation of the image of the P2 formed on the second face of the A4-size sheet A (i.e., rotation designation of small-size page). Therefore, in this case, the driver sets the image rotation designation of the P4 as 0° being identical with the image rotation designation of the P2, and then outputs such the designation to the printer unit as the instruction of the driver.

That is, as the binding direction arranging process to be performed in the case where the plural different-size sheets are bound into one sheaf, the driver sets to each image data the rotation designation data expecting that the sheet directions are arranged such that the short edge of the large-size sheet and the long edge of the small-size sheet overlap each other. In this case, the driver performs such the expectation in the manner same as that in the printer side.

On the other hand, in the case where the binding direction arranging process has been already performed at the driver side as above, the printer side may perform the image rotation process according to the instruction (or designation) by the driver and then perform the image formation. By doing so, since the image direction of the P4 formed on the second face of the recording sheet B is identical with the image direction on the other faces, even if the plural sheet sizes mixedly exist in one document, it is possible to obtain the optimum double-face print output result in which the binding directions are satisfactorily arranged (i.e., coincident).

Therefore, for example, it is possible to prevent the inconvenience that, when the user turns over the sheets one by one around the axis being the left edge of the sheaf and then looks at the image of the P4 on the fourth page, it is difficult for him to clearly recognize this image because the direction of only this image is upside down.

Furthermore, for example, if the short edge binding is set by the user on the printer driver setting screen, the driver performs the binding direction arranging process to rotate the small-size page according to the binding position of the large-size page. Hereinafter, this binding direction arranging process will be explained with reference to FIGS. 19A to 19D.

If the driver does not perform the binding direction arranging process but independently sets the corresponding rotation designation data to each page, the rotation designations of the images of the P1, P2, P3 and P4 are respectively set as 0°, 0°, 0° and 180° as described above, and these designations are outputted to the printer side as the instruction from the driver (FIG. 19B). In this case, if the printer side does not perform the binding direction arranging process, the image direction of the P2 formed on the second face of the sheet A is different from the image direction on the other faces by 180° as shown in FIG. 19C.

On the contrary, if the driver performs the binding direction arranging process, the rotation designation of the image formed on the A4-size sheet A is set to be matched with the rotation designation of the image formed on the A3-size sheet B. For example, the image rotation designation of the P2 formed on the second face of the sheet A (i.e., rotation designation of small-size page) is set to be identical with the image rotation designation of the P4 formed on the second face of the sheet B (i.e., rotation designation of large-size page). In this case, the image rotation designation of the P2 is set as 180° being identical with the image rotation designation of the P4.

Therefore, in the case where the binding direction arranging process is performed at the driver side, the driver sets the image rotation designations of the P1, P2, P3 and P4 as 0°, 180°, 0° and 180°, respectively, and outputs these designations to the printer unit as the instruction from the driver.

That is, as described above, as the binding direction arranging process to be performed in the case where the plural different-size sheets are bound into one sheaf, the driver sets to each image data the image rotation designation data expecting that the sheet directions are arranged such that the short edge of the large-size sheet and the long edge of the small-size sheet overlap each other.

In this case, the printer side performs the image rotation process according to the instruction (or designation) by the driver and then performs the image formation. By doing so, since the image direction of the P2 formed on the second face of the recording sheet A is identical with the image direction on the other faces, even if the plural sheet sizes mixedly exist in one document, it is possible to output the optimum double-face print result in which the binding directions are satisfactorily arranged (i.e., coincident).

As explained above, since the binding direction arranging process is performed at the driver side, it is unnecessary for the printer side to perform such the process, whereby it is possible to reduce the number of processes to be performed by the printer unit. Therefore, it is possible to improve process efficiency and reduce a load on the printer unit.

Furthermore, even if either mode (long edge binding double-face mode or short edge binding double-face mode) is set to the document mixedly containing the plural different-size pages by the user with the PC/WS 7A, it is performed at the printer side or the printer driver side the binding direction arranging process to set to each image data the rotation designation data expecting that the sheet directions are arranged such that the short edge of the large-size sheet and the long edge of the small-size sheet overlap each other when the plural different-size sheets are bound into one sheaf. Therefore, such the setting may be displayed on the setting screen of the PC/WS 7A.

Furthermore, as on the printer driver setting screen shown in FIG. 15C, if there are the plural buttons for setting the binding, only one of the buttons may be selectable, and the other buttons displayed may be thinned down or screened. By doing so, it is possible to reduce the operation to be performed by the user and prevent the erroneous operation by the user.

What is claimed is:

1. An image formation apparatus which lays out images on two faces of a sheet, comprising:

input means for inputting a job including the images of plural pages; and layout means for laying out, in a mode for binding a longer edge of the sheet and for a job including portrait-type images to be laid out on front and back faces of a first sheet is input, the images on the two faces of the first sheet such that directions of the images to be laid out on the two faces of the first sheet become identical with each other, when the sheets of one group are composed of the first sheets, wherein, in said mode and for a job including landscape-type images to be laid out on front and back faces of a second sheet of which size is larger than that of the first sheet is input, said layout means lays out the images on the two faces of the second sheet such that directions of the images to be laid out on the two faces of the second sheet become opposite to each other, when the sheets of one group are composed of the second sheets, and wherein, in said mode and for a job including the portrait-type images to be laid out on the two faces of the first sheet and the landscape-type images to be laid out on the two faces of the second sheet is input, said layout means lays out the images on the two faces of the second sheet such that the directions of the images to be laid out on the two faces of the second sheet are inhibited to become opposite to each other and the directions of the images to be laid out on the two faces of the second sheet become identical with each other, when the sheets of one group include both the first sheet and the second sheet.

2. An apparatus according to claim 1, wherein said layout means includes image formation means for forming the image on the sheet, and said apparatus further comprises stapling means for performing stapling processing to the sheet on which the image was formed by said image formation means.

3. An apparatus according to claim 1, wherein a job including the images of the plural pages is input from a computer.

4. An apparatus according to claim 1, further comprising:

first designation means for designating said mode by a job; and second designation means for designation the size of the sheet by a page.

5. An image formation apparatus which lays out images on two faces of a sheet, comprising:

input means for inputting a job including the images of plural pages; and layout means for laying out, in a mode for binding a shorter edge of the sheet and for a job including portrait-type images to be laid out on front and back faces of a first sheet is input, the images on the two faces of the first sheet such that directions of the images to be laid out on the two faces of the first sheet become opposite to each other, when the sheets of one group are composed of the first sheets, wherein, in said mode and for a job including landscape-type images to be laid out on front and back faces of a second sheet of which size is larger than that of the first sheet is input, said layout means lays out the images on the two faces of the second sheet such that directions of the images to be laid out on the two faces of the second sheet become identical with each other, when the sheets of one group are composed of the second sheets, and wherein, in said mode and for a job including the portrait-type images to be laid out on the two faces of the first sheet and the landscape-type images to be laid out on the two faces of the second sheet is input, said layout means lays out the images on the two faces of the first sheet such that the directions of the images to be laid out on the two faces of the first sheet are inhibited to become opposite to each other and the directions of the images to be laid out on the two faces of the first sheet become identical with each other, when the sheets of one group include both the first sheet and the second sheet.

6. An apparatus according to claim 5, wherein said layout means includes image formation means for forming the image on the sheet, and said apparatus further comprises stapling means for performing stapling processing to the sheet on which the image was formed by said image formation means.

7. An apparatus according to claim 5, wherein a job including the images of the plural pages is input from a computer.

8. An apparatus according to claim 5, further comprising:

first designation means for designating said mode by a job; and second designation means for designating the size of the sheet by a page.

9. An image formation apparatus which lays out images on two faces of a sheet, comprising:

input means for inputting a job including the images of plural pages; and layout means for laying out, in a mode for binding a longer edge of the sheet and for a job including landscape-type images to be laid out on front and back faces of a first sheet is input, the images on the two faces of the first sheet such that directions of the images to be laid out on the two faces of the first sheet become opposite to each other, when the sheets of one group are composed of the first sheets, wherein, in said mode and for a job including portrait-type images to be laid out on front and back faces of a second sheet of which size is larger than that of the first sheet is input, said layout means lays out the images on the two faces of the second sheet such that directions of the images to be laid out on the two faces of the second sheet become identical with each other, when the sheets of one group are composed of the second sheets, and wherein, in said mode and for a job including the landscape-type images to be laid out on the two faces of the first sheet and the portrait-type images to be laid out on the two faces of the second sheet is input, said layout means lays out the images on the two faces of the second sheet such that the directions of the images to be laid out on the two faces of the second sheet are inhibited to become identical with each other and the directions of the images to be laid out on the two faces of the second sheet become opposite to each other, when the sheets of one group include both the first sheet and the second sheet.

10. An apparatus according to claim 9, wherein said layout means includes image formation means for forming the image on the sheet, and said apparatus further comprises stapling means for performing stapling processing to the sheet on which the image was formed by said image formation means.

11. An apparatus according to claim 9, wherein a job including the images of the plural pages is input from a computer.

12. An apparatus according to claim 9, further comprising:

first designation means for designating said mode by a job; and second designation means for designating the size of the sheet by a page.

13. An image formation apparatus which lays out images on two faces of a sheet, comprising:

input means for inputting a job including the images of plural pages; and layout means for laying out, in a mode for binding a shorter edge of the sheet according to a job including landscape-type images to be laid out on front and back faces of a first sheet such that directions of the images to be laid out on the two faces of the first sheet become identical with each other, when the sheets of one group are composed of the first sheets, wherein, in said mode and for a job including portrait-type images to be laid out on front and back faces of a second sheet of which size is larger than that of the first sheet is input, said layout means lays out the images on the two faces of the second sheet such that directions of the image to be laid out on the two faces of the second sheet become opposite to each other, when the sheets of one group are composed of the second sheets, and wherein, in said mode and for a job including the landscape-type images to be laid out on the two faces of the first sheet and the portrait-type images to be laid out on the two faces of the second sheet is input, said layout means lays out the images on the two faces of the first sheet such that the directions of the images to be laid out on the two faces of the first sheet are inhibited to become identical with each other and the directions of the images to be laid out on the two faces of the first sheet become opposite to each other, when the sheets of one group include both the first sheet and the second sheet.

14. An apparatus according to claim 13, wherein said layout means includes image formation means for forming the image on the sheet, and said apparatus further comprises stapling means for performing stapling processing to the sheet on which the image was formed by said image formation means.

15. An apparatus according to claim 13, wherein a job including the images of the plural pages is input from a computer.

16. An apparatus according to claim 13, further comprising:

first designation means for designating said mode by a job; and second designation means for designating the size of the sheet by a page.

17. An image layout method for laying out images of plural pages included in one job, on two faces of a sheet, said method comprising:

a step of laying out, according to a job including portrait-type images to be laid out on front and back faces of a first sheet, the images on the two faces of the first sheet such that directions of the images to be laid out on the two faces of the first sheet become identical with each other, when the sheets of one group are composed of the first sheets;

a step of laying out, according to a job including landscape-type images to be laid out on front and back faces of a second sheet of which size is larger than that of the first sheet, the images on the two faces of the second sheet such that directions of the images to be laid out on the two faces of the second sheet become opposite to each other, when the sheets of one group are composed of the second sheets; and a step of laying out, according to a job including the portrait-type images to be laid out on the two faces of the first sheet and the landscape-type images to be laid out on the two faces of the second sheet, the images on the two faces of the second sheet such that the directions of the images to be laid out on the two faces of the second sheet are inhibited to become opposite to each other and the directions of the images to be laid out on the two faces of the second sheet become identical with each other, when the sheets of one group include both the first sheet and the second sheet.

18. An image layout method for laying out images of plural pages included in one job, on two faces of a sheet, said method comprising:

a step of laying out, according to a job including portrait-type images to be laid out on front and back faces of a first sheet, the images on the two faces of the first sheet such that directions of the images to be laid out on the two faces of the first sheet become opposite to each other, when the sheets of one group are composed of the first sheets;

a step of laying out, according to a job including landscape-type images to be laid out on front and back faces of a second sheet of which size is larger than that of the first sheet, the images on the two faces of the second sheet such that directions of the images to be laid out on the two faces of the second sheet become identical with each other, when the sheets of one group are composed of the second sheets; and a step of laying out, according to a job including the portrait-type images to be laid out on the two faces of the first sheet and the landscape-type images to be laid out on the two faces of the second sheet, the images on the two faces of the first sheet such that the directions of the images to be laid out on the two faces of the first sheet are inhibited to become opposite to each other and the directions of the images to be laid out on the two faces of the first sheet become identical with each other, when the sheets of one group include both the first sheet and the second sheet.

19. An image layout method for laying out images of plural pages included in one job, on two faces of a sheet, said method comprising:

a step of laying out, according to a job including landscape-type images to be laid out on front and back faces of a first sheet, the images on the two faces of the first sheet such that directions of the images to be laid out on the two faces of the first sheet become opposite to each other, when the sheets of one group are composed of the first sheets;

a step of laying out, according to a job including portrait-type images to be laid out on front and back faces of a second sheet of which size is larger than that of the first sheet, the images on the two faces of the second sheet such that directions of the images to be laid out on the two faces of the second sheet become identical with each other, when the sheets of one group are composed of the second sheets; and a step of laying out, according to a job including the landscape-type images to be laid out on the two faces of the first sheet and the portrait-type images to be laid out on the two faces of the second sheet, the images on the two faces of the second sheet such that the directions of the images to be laid out on the two faces of the second sheet are inhibited to become identical with each other and the directions of the images to be laid out on the two faces of the second sheet become opposite to each other, when the sheets of one group include both the first and the second sheet.

20. An image layout method for laying out images of plural pages included in one job, on two faces of a sheet, said method comprising:

a step of laying out, according to a job including landscape-type images to be laid out on front and back faces of a first sheet, the images on the two faces of the first sheet such that directions of the image to be laid out on the two faces of the first sheet become identical with each other, when the sheets of one group are composed of the first sheets;

a step of laying out, according to a job including portrait-type images to be laid out on front and back faces of a second sheet of which size is larger than that of the first sheet, the images on the two faces of the second sheet such that directions of the images to be laid out on the two faces of the second sheet become opposite to each other, when the sheets of one group are composed of the second sheets; and a step of laying out, according to a job including the landscape-type images to be laid out on the two faces of the first sheet and the portrait-type images to be laid out on the two faces of the second sheet, the images on the two faces of the first sheet such that the directions of the images to be laid out on the two faces of the first sheet are inhibited to become identical with each other and the directions of the images to be laid out on the two faces of the first sheet become opposite to each other, when the sheets of one group include both the first sheet and the second sheet.

21. A computer-readable storage medium which stores a program to execute;

a step of inputting a job including images of plural pages to an image formation apparatus for laying out the images on two faces of a sheet;

a step of laying out, in a mode of binding a longer edge of the sheet and according to a job including portrait-type images to be laid out on front and back faces of a first sheet is input, the images on the two faces of the first sheet such that directions of the images to be laid out on the two faces of the first sheet become identical with each other, when the sheet of one group are composed of the first sheets;

a step of laying out, in said mode and according to a job including landscape-type images to be laid out on front and back faces of a second sheet of which size is larger than that of the first sheet is input, the images on the two faces of the second sheet such that directions of the image to be laid out on the two faces of the second sheet become opposite to each other, when the sheets of one group are composed of the second sheets; and a step of laying out, in said mode and according to a job including the portrait-type images to be laid out on the two faces of the first sheet and the landscape-type images to be laid out on the two faces of the second sheet is input, the images on the two faces of the second sheet such that the directions of the images to be laid out on the two faces of the second sheet are inhibited to become opposite to each other and the directions of the images to be laid out on the two faces of the second sheet become identical with each other, when the sheets of one group include both the first sheet and the second sheet.

22. A computer-readable storage medium which stores a program to execute:

a step of inputting a job including images of plural pages to an image formation apparatus for laying out the images on two faces of a sheet;

a step of laying out, in a mode of binding a shorter edge of the sheet and according to a job including portrait-type images to be laid out on front and back faces of a first sheet is input, the images on the two faces of the first sheet such that directions of the images to be laid out on the two faces of the first sheet become opposite to each other, when the sheets of one group are composed of the first sheets;

a step of laying out, in said mode and according to a job including landscape-type images to be laid out on front and back faces of a second sheet of which size is larger than that of the first sheet is input, the images on the two faces of the second sheet such that directions of the images to be laid out on the two faces of the second sheet become identical with each other, when the sheets of one group are composed of the second sheets; and a step of laying out, in said mode and according to a job including the portrait-type images to be laid out on the two faces of the first sheet and the landscape-type images to be laid out on the two faces of the second sheet is input, the images on the two faces of the first sheet such that the directions of the images to be laid out on the two faces of the first sheet are inhibited to become opposite to each other and the directions of the images to be laid out on the two faces of the first sheet become identical with each other, when the sheets of one group include both the first sheet and the second sheet.

23. A computer-readable storage medium which stores a program to execute:

a step of inputting a job including images of plural pages to an image formation apparatus for laying out the images on two faces of a sheet;

a step of laying out, in a mode of binding a longer edge of the sheet and according to a job including landscape-type images to be laid out on front and back faces of a first sheet is input, the images on the two faces of the first sheet such that directions of the images to be laid out on the two faces of the first sheet become opposite to each other, when the sheets of one group are composed of the first sheets;

a step of laying out, in said mode and according to a job including portrait-type images to be laid out on front and back faces of a second sheet of which size is larger than that of the first sheet is input, the images on the two faces of the second sheet such that directions of the images to be laid out on the two faces of the second sheet become identical with each other, when the sheets of one group are composed of the second sheets; and a step of laying out, in said mode and according to a job including the landscape-type images to be laid out on the two faces of the first sheet and the portrait-type images to be laid out on the two faces of the second sheet is input, the images on the two faces of the second sheet such that the directions of the images to be laid out on the two faces of the second sheet are inhibited to become identical with each other and the directions of the images to be laid out on the two faces of the second sheet become opposite to each other, when the sheets of one group include both the first sheet and the second sheet.

24. A computer-readable storage medium which stores a program to execute;

a step of inputting a job including images of plural pages to an image formation apparatus for laying out the images on two faces of a sheet;

a step of laying out, in a mode of binding a shorter edge of the sheet and according to a job including landscape-type images to be laid out on front and back faces of a first sheet is input, the images on the two faces of the first sheet such that directions of the images to be laid out on the two faces of the first sheet become identical with each other, when the sheets of one group are composed of the first sheets;

a step of laying out, in said mode and according to a job including portrait-type images to be laid out on front and back faces of the first sheet is input, the images on the two faces of the second sheet such that directions of the images to be laid out on the two faces of the second sheet become opposite to each other, when the sheets of one group are composed of the second sheets; and a step of laying out, in said mode and according to a job including the landscape-type images to be laid out on the two faces of the first sheet and the portrait-type images to be laid out on the two faces of the second sheet is input, the images on the two faces of the first sheet such that the directions of the images to be laid out on the two faces of the first sheet are inhibited to become identical with each other and the directions of the images to be laid out on the two faces of the first sheet become opposite to each other, when the sheets of one group include both the first sheet and the second sheet.

25. An image formation apparatus which performs binding processing to a sheaf of plural sheets, comprising:

binding processing means for performing the binding processing to the left edge part of the sheaf in the front, in a mode of binding a longer edge of the sheet wherein the sheaf consists of first sheets on which portrait-type images are formed, wherein said binding processing means performs the binding processing to the upper edge part of the sheaf in the front, in said mode wherein the sheaf consists of second sheets on which landscape-type images were formed, and said binding processing means inhibits from performing the binding processing to the upper edge part of the sheaf in the front and performs the binding processing to the left edge part of the sheaf in the front, and wherein, in said mode, the sheaf includes the first sheet and the second sheet, the size of the second sheet being larger than that of the first sheet.

26. An image formation apparatus which performs binding processing to a sheaf of plural sheets, comprising:

binding processing means for performing the binding processing to the upper edge part of the sheaf in the front, in a mode of binding a longer edge of the sheet wherein the sheaf consists of first sheets on which landscape-type images were formed, wherein said binding processing means performs the binding processing to the left edge part of the sheaf in the front, in said mode wherein the sheaf consists of second sheets on which portrait-type images were formed, and said binding processing means inhibits from performing the binding processing to the left edge part of the sheaf in the front and performs the binding processing to the upper edge part of the sheaf in the front, and wherein, in said mode, the sheaf includes the first sheet and the second sheet, the size of the second sheet being larger than that of the first sheet.

27. An image formation apparatus which performs binding processing to a sheaf of plural sheets, comprising:

binding processing means for performing the binding processing to the upper edge part of the sheaf in the front, in a mode of binding a shorter edge of the sheet wherein the sheaf consists of first sheets on which portrait-type images were formed, wherein said binding processing means performs the binding processing to the left edge part of the sheaf in the front, in said mode wherein the sheaf consists of the second sheets on which landscape-type images were formed, and said binding processing means inhibits from performing the binding processing to the upper edge part of the sheaf in the front and performs the binding processing to the left edge part of the sheaf in the front, wherein, in said mode, the sheaf includes the first sheet and the second sheet, the size of the second sheet being larger than that of the first sheet.

28. An image formation apparatus which performs binding processing to a sheaf of plural sheets, comprising:

binding processing means for performing the binding processing to the left edge part of the sheaf in the front, in a mode of binding a shorter edge of the sheet wherein the sheaf consists of first sheets on which landscape-type images were formed, wherein said binding processing means performs the binding processing to the upper edge part of the sheaf in the front, wherein, in said mode, the sheaf consists of second sheets on which portrait-type images were formed, and said binding processing means inhibits from performing the binding processing to the left edge part of the sheaf in the front and performs the binding processing to the upper edge part of the sheaf in the front, wherein, in said mode, the sheaf includes the first sheet and the second sheet, the size of the second sheet being larger than that of the first sheet.

29. A sheet binding processing method which performs binding processing to a sheaf of plural sheets, comprising:

a step of performing the binding processing to the left edge part of the sheaf in the front, in a mode of binding a longer edge of the sheet wherein the sheaf consists of first sheets on which portrait-type images were formed;

a step of performing the binding processing to the upper edge part of the sheaf in the front, wherein, in said mode, the sheaf consists of second sheets on which landscape-type images were formed; and a step of inhibiting from performing the binding processing to the upper edge part of the sheaf in the front and of performing the binding processing to the left edge part of the sheaf in the front, wherein, in said mode, the sheaf includes the first sheet and the second sheet, the size of the second sheet being larger than that of the first sheet.

30. A sheet binding processing method which performs binding processing to a sheaf of plural sheets, comprising:

a step of performing the binding processing to the upper edge part of the sheaf in the front, in a mode of binding a longer edge of the sheet wherein the sheaf consists of first sheets on which landscape-type images were formed;

a step of performing the binding processing to the left edge part of the sheaf in the front, wherein, in said mode, the sheaf consists of second sheets on which portrait-type images were formed; and a step of inhibiting from performing the binding processing to the left edge part of the sheaf in the front and of performing the binding processing to the upper edge part of the sheaf in the front, wherein, in said mode, the sheaf includes the first sheet and the second sheet, the size of the second sheet being larger than that of the first sheet.

31. A sheet binding processing method which performs binding processing to a sheaf of plural sheets, comprising:

a step of performing the binding processing to the upper edge part of the sheaf in the front, in a mode of binding a shorter edge of the sheet wherein the sheaf consists of first sheets on which portrait-type images were formed;

a step of performing the binding processing to the left edge part of the sheaf in the front, wherein, in said mode, the sheaf consists of second sheets on which landscape-type images were formed; and a step of inhibiting from performing the binding processing to the upper edge part of the sheaf in the front and of performing the binding processing to the left edge part of the sheaf in the front, wherein, in said mode, the sheaf includes the first sheet and the second sheet, the size of the second sheet being larger than that of the first sheet.

32. A sheet binding processing method which performs binding processing to a sheaf of plural sheets, comprising:

a step of performing the binding processing to the left edge part of the sheaf in the front, in a mode of binding a shorter edge of the sheet wherein the sheaf consists of first sheets on which landscape-type image were formed;

a step of performing the binding processing to the upper edge part of the sheaf in the front, wherein, in said mode, the sheaf consists of second sheets on which portrait-type images were formed; and a step of inhibiting from performing the binding processing to the left edge part of the sheaf in the front and of performing the binding processing to the upper edge part of the sheaf in the front, and wherein, in said mode, the sheaf includes the first sheet and the second sheet, the size of the second sheet being larger than that of the first sheet.

33. A computer-readable storage medium which stores a program to cause an image formation apparatus for performing binding processing to a sheaf of plural sheets to execute:

a step of performing the binding processing to the left edge part of the sheaf in the front, in a mode of binding a longer edge of the sheet wherein the sheaf consists of first sheets on which portrait-type images were formed;

a step of performing the binding processing to the upper edge part of the sheaf in the front, wherein, in said mode, the sheaf consists of second sheets on which landscape-type images were formed; and a step of inhibiting from performing the binding processing to the upper edge part of the sheaf in the front and of performing the binding processing to the left edge part of the sheaf in the front, wherein, in said mode, the sheaf includes the first sheet and the second sheet, the size of the second sheet being larger than that of the first sheet.

34. A computer-readable storage medium which stores a program to cause an image formation apparatus for performing binding processing to a sheaf of plural sheets to execute:

a step of performing the binding processing to the upper edge part of the sheaf in the front, in a mode of binding a longer edge of the sheet wherein the sheaf consists of first sheets on which landscape-type images were formed;

a step of performing the binding processing to the left edge part of the sheaf in the front, wherein, in said mode, the sheaf consists of second sheets on which portrait-type images were formed; and a step of inhibiting from performing the binding processing to the left edge part of the sheaf in the front and of performing the binding processing to the upper edge part of the sheaf in the front, wherein, in said mode, the sheaf includes the first sheet and the second sheet, the size of the second sheet being larger than that of the first sheet.

35. A computer-readable storage medium which stores a program to cause an image formation apparatus for performing binding processing to a sheaf of plural sheets to execute:

a step of performing the binding processing to the upper edge part of the sheaf in the front, in a mode of binding a shorter edge of the sheet wherein the sheaf consists of first sheets on which portrait-type images were formed;

a step of performing the binding processing to the left edge part of the sheaf in the front, wherein, in said mode, the sheaf consists of second sheets on which landscape-type images were formed; and a step of inhibiting from performing the binding processing of the upper edge part of the sheaf in the front and of performing the binding processing to the left edge part of the sheaf in the front, wherein, in said mode, the sheaf includes the first sheet and the second sheet, the size of the second sheet being larger than that of the first sheet.

36. A computer-readable storage medium which stores a program to cause an image formation apparatus for performing binding processing to a sheaf of plural sheets to execute:

a step of performing the binding processing to the left edge part of the sheaf in the front, in a mode of binding a shorter edge of the sheet wherein the sheaf consists of first sheets on which landscape-type images were formed;

a step of performing the binding processing to the upper edge part of the sheaf in the front, wherein, in said mode, the sheaf consists of second sheets on which portrait-type images were formed; and a step of inhibiting from performing the binding processing to the left edge part of the sheaf in the front and of performing the binding processing to the upper edge part of the sheaf in the front, wherein, in said mode, the sheaf includes the first sheet and the second sheet, the size of the second sheet being larger than that of the first sheet.

* * * * *

UNITED STATES PATENT AND TRADEMARK OFFICE
CERTIFICATE OF CORRECTION

PATENT NO. : 6,336,011 B1
DATED : January 1, 2002
INVENTOR(S) : Hiroshi Sumio et al.

It is certified that error appears in the above-identified patent and that said Letters Patent is hereby corrected as shown below:

Column 2,
Line 6, "is." should read -- is --; and
Line 28, "the" should read -- a --.

Column 3,
Line 10, "structures" should read -- structure --; and
Line 47, "eight" should read -- eighth --.

Column 4,
Line 21, "Numeral-7" should read -- Numeral 7 --; and
Line 46, "through a" should read -- through --.

Column 14,
Line 61, "N-th." should read -- N-th --.

Column 15,
Line 48, "the rein" should read -- therein --.

Column 18,
Line 56, "B." should read -- B --.

Column 23,
Line 35, "designation." should read -- designation --; and
Line 61, "1800" should read -- 180° --.

Signed and Sealed this

Eighteenth Day of February, 2003

JAMES E. ROGAN
*Director of the United States Patent and Trademark Office*